(12) United States Patent
Straley et al.

(10) Patent No.: US 11,284,019 B1
(45) Date of Patent: Mar. 22, 2022

(54) SYSTEMS AND METHODS FOR CROWDSOURCED VIDEO ORCHESTRATION

(71) Applicant: Verizon Patent and Licensing Inc., Basking Ridge, NJ (US)

(72) Inventors: Jay Cee Straley, Simi Valley, CA (US); Sean Hsu, San Francisco, CA (US); Stephane Chaysinh, Basking Ridge, NJ (US); John A. Turato, Garden City South, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/101,764

(22) Filed: Nov. 23, 2020

(51) Int. Cl.
| | |
|---|---|
| *H04N 5/247* | (2006.01) |
| *H04N 5/268* | (2006.01) |
| *H04N 5/232* | (2006.01) |
| *G06T 7/00* | (2017.01) |
| *H04N 21/44* | (2011.01) |
| *H04N 21/45* | (2011.01) |
| *B64D 47/08* | (2006.01) |
| *B64C 39/02* | (2006.01) |

(52) U.S. Cl.
CPC .......... *H04N 5/247* (2013.01); *B64C 39/024* (2013.01); *B64D 47/08* (2013.01); *G06T 7/0002* (2013.01); *H04N 5/23299* (2018.08); *H04N 5/268* (2013.01); *H04N 21/44* (2013.01); *H04N 21/4524* (2013.01); *B64C 2201/127* (2013.01); *G06T 2207/10016* (2013.01); *G06T 2207/30168* (2013.01); *G06T 2207/30228* (2013.01); *G06T 2207/30244* (2013.01)

(58) Field of Classification Search
None
See application file for complete search history.

(56) References Cited

U.S. PATENT DOCUMENTS

2019/0132371 A1* 5/2019 Bhat ................... H04L 65/4076
2021/0191390 A1* 6/2021 Hwang .............. H04N 5/23299

* cited by examiner

*Primary Examiner* — Eileen M Adams

(57) ABSTRACT

A system described herein may provide a technique for the real-time determination of events, objects, focal points, or the like to be captured by one or more cameras in a multi-camera environment. Such determination may be based on "crowdsourced" data from multiple User Equipment ("UEs"). The crowdsourced data may include positioning and/or pose information associated with UEs. The positioning information for a given UE may include location information, and the pose information may include an azimuth angle, magnetic declination, or other suitable information indicating where a particular physical facet of the UE is facing. For example, the pose information may be used to indicate or infer where a camera of the UE is pointed. One or more actuatable cameras may be displaced, rotated, etc. to capture video at one or more identified crowdsourced focal points.

20 Claims, 13 Drawing Sheets

SYSTEMS AND METHODS FOR CROWDSOURCED VIDEO ORCHESTRATION

BACKGROUND

Content providers or content generators, which may generate or provide video content relating to live sports content, news content, and/or other types of content, may utilize multi-camera arrangements in order to capture video content at varying locations and/or with different angles. A director, producer, a production team, and/or other human operator(s) may monitor multiple video feeds from multiple cameras and may manually select a particular one of the cameras from which a video feed should be incorporated into a broadcast for consumption by an audience of the broadcast.

DETAILED DESCRIPTION OF EXAMPLE EMBODIMENTS

The following detailed description refers to the accompanying drawings. The same reference numbers in different drawings may identify the same or similar elements.

Embodiments described herein provide for the real-time determination of events, objects, focal points, or the like to be captured by one or more cameras in a multi-camera environment. Such determination may be based on "crowdsourced" data from multiple UEs, such as mobile telephones, tablets, or other suitable devices. As described herein, the crowdsourced data may include positioning and/or pose information associated with UEs. The positioning information for a given UE may include, for example, location information indicating latitude and longitude coordinates or other indicator of geographical location. In some embodiments, the positioning information may indicate a position of the UE in three-dimensional space. For example, the positioning information may include a height component, such as an altitude, a floor of a building, and/or other type of information indicating a height of a given UE. The pose information may include an azimuth angle, magnetic declination, or other suitable information indicating where a particular physical facet of the UE is facing. For example, the pose information may be used to indicate or infer where a camera of the UE is pointed.

Figure 1:
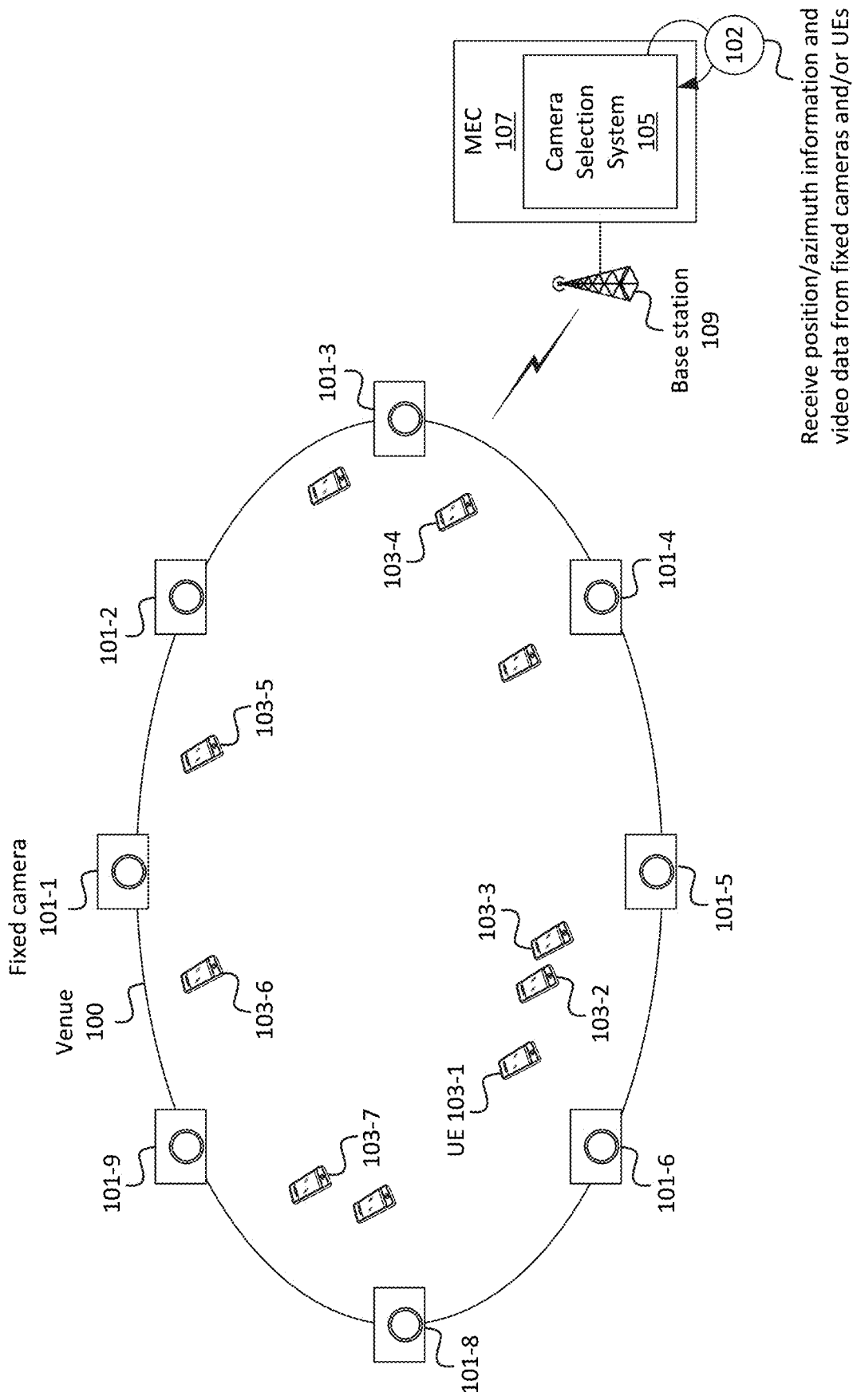
FIG. 1 illustrates an example arrangement of one or more embodiments described herein, in which a Camera Selection System ("CSS") may receive video data and/or other information from cameras and/or User Equipment ("UEs") located in a given area.

As shown in FIG. 1, for example, a particular venue 100 may include a set of fixed cameras 101-1 through 101-9 (sometimes referred to collectively herein as "fixed cameras 101"). In the examples described herein, venue 100 may include a stadium, and fixed cameras 101 may be cameras that are affixed or are otherwise situated within the stadium. In some embodiments, fixed cameras 101 may be actuatable, such that fixed cameras 101 may be actuated to point in different directions, which may include rotating such fixed cameras 101 about one or more axes. In some embodiments, fixed cameras 101 may be actuated to move to different vantage points, which may include moving fixed cameras 101 along one or more tracks, moving drones to which fixed cameras 101 are attached, or the like. In some embodiments, the actuation of fixed cameras 101 may be performed programmatically or automatically, such that a command from a human operator need not be issued in order for fixed cameras 101 to be actuated. Thus, while referred to herein as "fixed" cameras, such cameras are not necessarily stationary, and may be programmatically or automatically moved, displaced, rotated, etc. in some embodiments.

As further shown, a set of UEs 103 (e.g., UEs 103-1 through 103-7, as well as other UEs depicted in the figure without specific reference numerals) may be located within venue 100 at a given time. In some embodiments, UEs 103 may include devices such as mobile telephones, tablets, or the like. In some embodiments, UEs 103 may be, may include, or may be communicatively coupled, one or more other types of devices, such as a wearable device (e.g., "smart" glasses, a "smart" watch, or the like), an external camera, etc. As referred to herein, UE 103 may include multiple devices that are communicatively coupled to each other (e.g., via a wired or wireless link), such as a set of smart glasses communicatively coupled a mobile telephone via a Bluetooth interface, WiFi interface, Universal Serial Bus (e.g., wired) interface, or other suitable type of link or interface.

Camera Selection System 105 may receive (at 102) positioning and/or pose information associated with fixed cameras 101 and/or UEs 103. For example, as discussed above, the positioning and/or pose information may include two-dimensional and/or three-dimensional location information, azimuth angles, and/or other suitable information to indicate where fixed cameras 101 and/or UEs 103 are located and facing. For example, Camera Selection System 105 may be associated with an application programming interface ("API"), web portal, or other suitable communication pathway via which Camera Selection System 105 may receive such information. In some embodiments, Camera Selection System 105 may receive positioning and/or pose information associated with fixed cameras 101 from a control center or other suitable system that maintains or provides such information.

Camera Selection System 105 may receive positioning and/or pose information associated with UEs 103 from an application executing at UE 103, and/or from one or more elements of a wireless network to which UEs 103 are connected. In some embodiments, as mentioned above, UE 103 may be or may be communicatively coupled one or more wearable devices, such as a set of "smart" glasses. In some embodiments, smart glasses may include one or more video capture components (e.g., cameras), which may generally correspond to a direction that a user who is wearing the smart glasses is facing. In this manner, positioning and/or pose information associated with a given UE 103 may directly indicate a direction in which a particular user is facing. In some embodiments, such communicatively coupled device may provide pose information to UE 103, which may provide (at 102) such pose information to Camera Selection System 105. Additionally, or alternatively, UE 103 may include one or more applications or other functions which may analyze data received from such communicatively coupled device (e.g., may analyze video data, metadata, or other data) to determine a direction in which such communicatively coupled device is facing.

In some embodiments, Camera Selection System 105 may also receive (at 102) video data from fixed cameras 101 and/or UEs 103. For example, fixed cameras 101 may capture video data, and such video data may be streamed, uploaded, or otherwise provided to Camera Selection System 105. Further, UEs 103 may capture video data via one or cameras (e.g., integrated cameras or external cameras that are communicatively coupled to respective UEs 103 via a wireless link or some other suitable communication interface), and may stream, upload, or otherwise provide such video data to Camera Selection System 105.

As further shown in FIG. 1, Camera Selection System 105 may, in some embodiments, be implemented at an "edge" location of a radio access network ("RAN"), such as at a Multi-Access/Mobile Edge Computing ("MEC") device, referred to sometimes herein simply as ("MEC") 107 that is communicatively coupled to a base station 109 of the RAN. In this manner, Camera Selection System 105 may be capable of receiving a relatively large amount of data (e.g., video streams from hundreds, thousands, or more UEs 103) with relatively low latency, in order to perform operations described herein in real time or near-real time. In some embodiments, Camera Selection System 105 may communicate with fixed cameras 101 and/or other devices or systems via one or more other types of communication pathways (e.g., in addition to, or in lieu of, wireless communications via base station 109). For example, Camera Selection System 105 may include one or more wired interfaces in addition to, or in lieu of, the wireless interface provided via base station 109.

Figure 2:
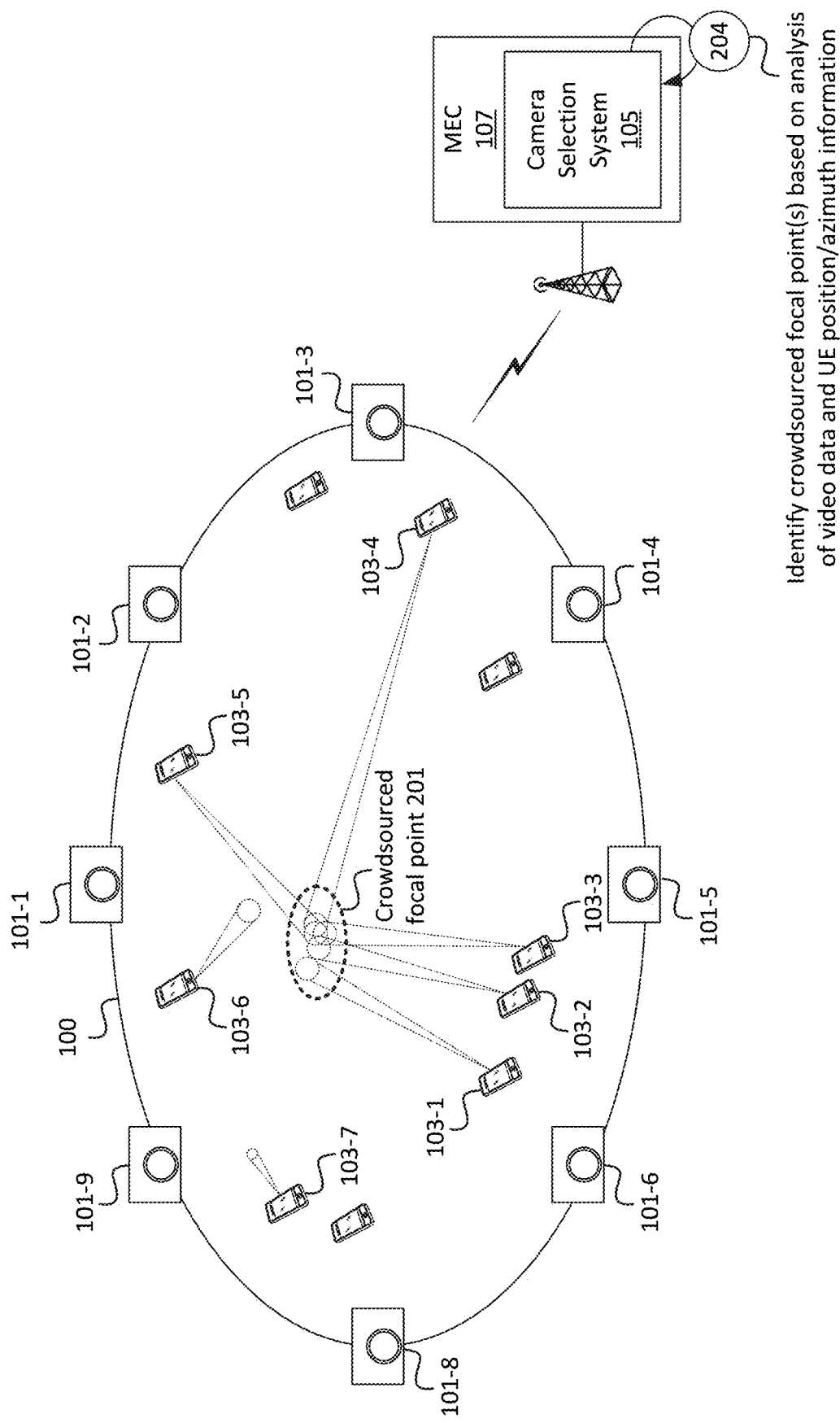
FIG. 2 illustrates an example determination of a crowdsourced focal point based on video data and/or other information received from UEs located in a given area, in accordance with some embodiments.

Camera Selection System 105 may receive (at 102) the video data, location information, and/or pose information on an ongoing basis. In this manner, Camera Selection System 105 may maintain up-to-date (e.g., real time) information regarding UEs 103 and/or fixed cameras 101, and may identify areas of potential interest based on such information. For example, as shown in FIG. 2, the positioning and/or pose information (e.g., as received at 102) may be used by Camera Selection System 105 to identify (at 204) a particular crowdsourced focal point 201. As used herein, the term "focal point" may refer to a point, a two-dimensional region, or a three-dimensional region. Generally, a "focal point," as discussed herein, may relate to an event, object, or area that is to be visually captured by a given camera (e.g., fixed camera 101, a camera associated with UE 103, etc.). For example, crowdsourced focal point 201 may be identified by Camera Selection System 105 based on positioning and/or pose information associated with one or more UEs 103, indicating that UEs 103 are pointed towards crowdsourced focal point 201. For example, the positioning and/or pose information associated with the one or more UEs 103 may indicate that a camera associated with such UEs 103 is facing towards crowdsourced focal point 201. Additionally, or alternatively, Camera Selection System 105 may receive video data from such UEs 103 and perform an analysis of the video data (e.g., a computer vision analysis or other suitable type of analysis) to identify that UEs 103 are pointed at the same object, event, location, etc. In some embodiments, Camera Selection System 105 may determine that the cameras are all facing the same direction based on their pose information relative to reference positioning information. For example, Camera Selection System may determine viewing vectors, frustums, or the like for each UE 103, where an origination point of a vector, frustum, etc. associated with a particular UE 103 corresponds to a location of the particular UE 103 and where a directionality of the vector, frustum, etc. is based on the pose information of the particular UE 103 (e.g., indicating where the particular UE 103 is facing).

In this example, for example, UEs 103-1 through 103-5 are facing approximately the same area within venue 100. That is, while UEs 103-1 through 103-5 may not necessarily be pointing at the exact same point or location, Camera Selection System 105 may determine that UEs 103-1 through 103-5 are pointing at or within the same area (referred to as crowdsourced focal point 201). As described below, Camera Selection System 105 may generate a heatmap or other suitable representation in order to identify one or more crowdsourced focal points at a given time. As further shown, the determination of crowdsourced focal point 201 may not require all UEs 103 that are within venue 100 or are otherwise proximate to UEs 103-1 through 103-5 to be facing crowdsourced focal point 201. For example, as shown, UE 103-6 and UE 103-7 may be pointed at locations other than crowdsourced focal point 201. In some embodiments, only a predetermined threshold amount or percentage of UEs may be used for heatmap determination.

Further, some UEs 103 within venue 100 may have an integrated camera which may not be in use (e.g., such UEs 103 may be located within a user's pocket or purse, and/or a camera application may otherwise not be in use at the time), and/or may not be communicatively coupled to an external video capture device (e.g., external camera, wearable device, or the like). In some embodiments, Camera Selection System 105 may not determine crowdsourced focal point 201 based on information from such UEs 103. That is, in situations where UE 103 is not using a camera application (e.g., where such application captures video via an internal camera of UE 103 and/or receives video captured by an external device such as a wearable device), UE 103 may not report location and/or positioning information to Camera Selection System 105, and/or Camera Selection System 105 may not use location and/or positioning information associated with such UEs 103 to identify crowdsourced focal point 201. In some embodiments, the quantity or proportion of UEs 103 that are using a camera or camera application (e.g., as opposed to UEs 103 that are within venue 100 or are otherwise within a threshold location of crowdsourced focal point 201 and/or other UEs 103, and are not using a camera or camera application) may be a factor based on which Camera Selection System 105 determines the existence of crowdsourced focal point 201. For example, if 40,000 UEs 103 are located within venue 100 and twenty UEs 103 are pointed at the same area, Camera Selection System 105 may not determine that such area is a suitable crowdsourced focal point. If, on the other hand, 1,000 of the 40,000 UEs 103 are pointed at the same area, Camera Selection System 105 may determine that such area is a suitable crowdsourced focal point. In some embodiments, the threshold at which Camera Selection System 105 determines that a crowdsourced focal point exists may be determined or refined using artificial intelligence/machine learning ("AI/ML") techniques or other suitable techniques.

Figure 3:
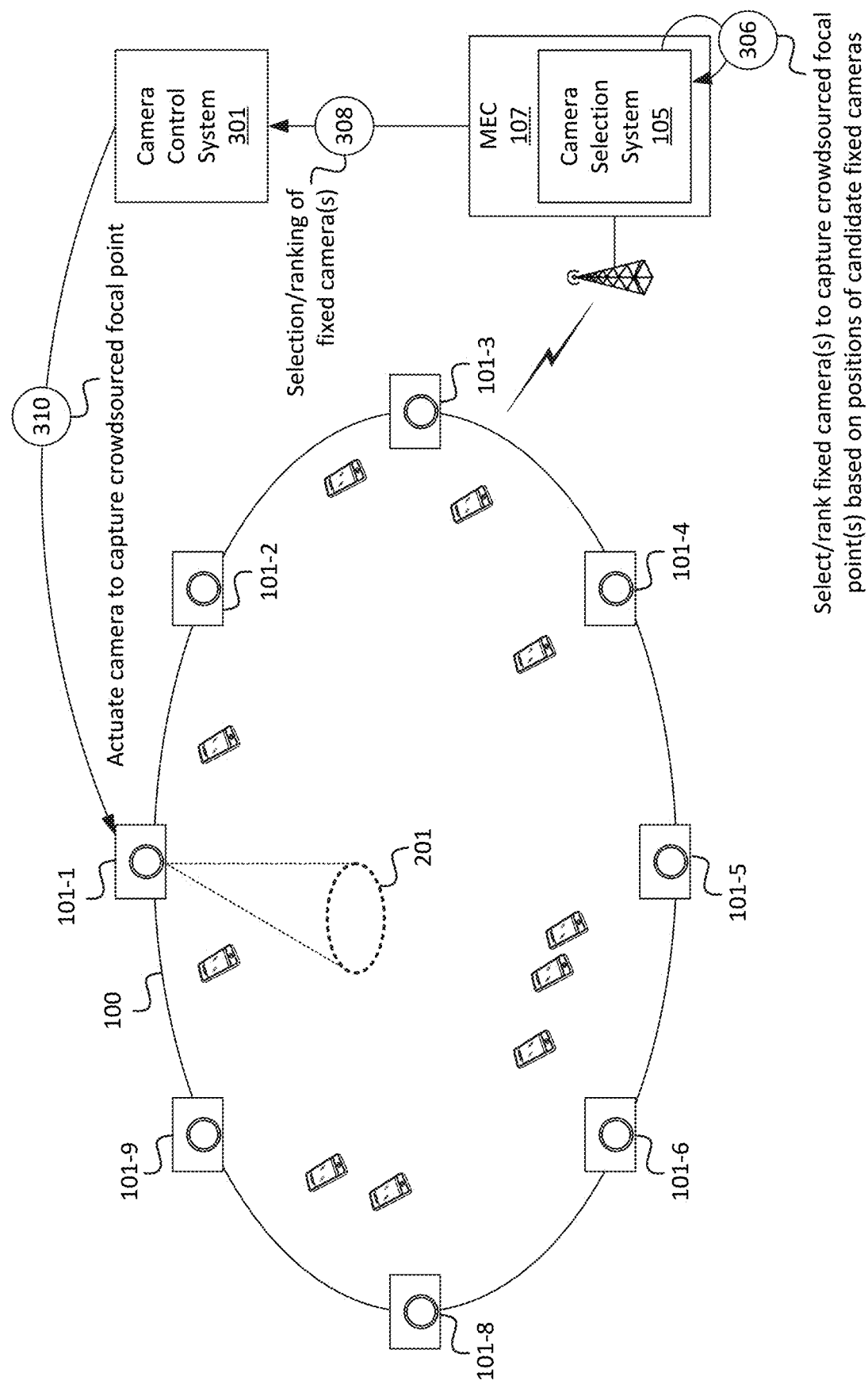
FIG. 3 illustrates an example of the selection and/or actuation of a particular camera, from a set of candidate cameras, to capture video data based on a crowdsourced focal point in accordance with some embodiments.

Once Camera Selection System 105 has identified (at 204) crowdsourced focal point 201, Camera Selection System 105 may cause one or more fixed cameras 101 to capture video associated with crowdsourced focal point 201. For example, as shown in FIG. 3, Camera Selection System 105 may identify a particular fixed camera 101 to capture crowdsourced focal point 201, and/or may rank one or more fixed cameras 101 to capture crowdsourced focal point 201. For example, Camera Selection System 105 may select, based on positioning and/or pose information associated with fixed cameras 101, which of the fixed cameras 101 is best suited to capture crowdsourced focal point 201. Such selection or ranking may be based on any suitable criteria, such as distance of fixed camera 101 from crowdsourced focal point 201, azimuth angle of fixed camera 101, characteristics of fixed camera 101 (e.g., where different fixed cameras may have differing characteristics or capabilities, such as zoom capability, low-light capability, resolution, etc.). In some embodiments, as discussed below, the selection or ranking may be based on analysis of video provided by fixed cameras 101 (e.g., a computer vision analysis or other suitable analysis). In some embodiments, the selecting and/or ranking may be based on viewing area capabilities of fixed cameras 101. For example, if a given fixed camera 101 is presently facing a location or area other than crowdsourced focal point 201, the ability for fixed camera 101 to be actuated (e.g., rotated, moved along a track, moved via a drone to which fixed camera 101 is attached, etc.) to face crowdsourced focal point 201 may be a factor based on which Camera Selection System 105 may select or rank fixed camera 101.

The criteria based on which Camera Selection System 105 may select or rank fixed cameras 101 may be generated or refined using AI/ML techniques or other suitable techniques. Although described in the context of ranking or selecting fixed cameras 101, Camera Selection System 105 may additionally, or alternatively, select or rank particular UEs 103. For example, in some situations, a given UE 103 may be capable of capturing "better" video than fixed cameras 101, such as situations where crowdsourced focal point 201 is relatively close to UE 103 (e.g., within five meters of UE 103), where obstructions prevent fixed cameras 101 from capturing crowdsourced focal point 201 (e.g., where a crowd of people or objects may be situated between fixed cameras 101 and crowdsourced focal point 201), or other situations. In some embodiments, the same or similar criteria applied to selecting or ranking (at 306) fixed cameras 101 may apply to selecting or ranking respective UEs 103.

Camera Selection System 105 may provide (at 308) an indication of the selection or ranking of the particular fixed camera 101 to Camera Control System 301. In this example, Camera Selection System 105 may have selected fixed camera 101-1 to capture crowdsourced focal point 201 (and/or may have ranked fixed camera 101-1 highest in a ranked list than includes multiple fixed cameras 101 and/or UEs 103). Camera Control System 301 may include a device or system that is communicatively coupled to fixed cameras 101, and/or to actuation equipment that is able to modify positions and/or azimuth angles of fixed cameras 101. Such actuation equipment may include motors, arms, drones, tracks, gimbals, or other suitable equipment which may be automatically and/or programmatically controlled by Camera Control System 301, Camera Selection System 105, and/or some other device or system. In some embodiments, Camera Control System 301 may be implemented by the same device or system that implements Camera Selection System 105 (e.g., MEC 107). In some embodiments, Camera Control System 301 may be implemented by a device or system that is communicatively coupled to Camera Selection System 105 via an API or other suitable interface. In some embodiments, Camera Selection System 105 may also, or alternatively, indicate (at 308) a location or area associated with crowdsourced focal point 201. In some such embodiments, Camera Control System 301 may select or rank fixed cameras 101 to capture video associated with crowdsourced focal point 201.

Based on the selection and/or ranking (e.g., as provided by Camera Selection System 105 at 308), Camera Control System 301 may actuate (at 310) the selected fixed camera 101. For example, in this example, Camera Control System 301 may cause fixed camera 101-1 to capture video associated with crowdsourced focal point 201. As noted above, such actuation may include physically moving fixed camera 101-1 and/or rotating fixed camera 101-1 to capture video associated with crowdsourced focal point 201. In some embodiments, Camera Control System 301 may modify other parameters or attributes of fixed camera 101-1, such as a zoom level, focal length, field of view, shutter speed, and/or other suitable parameters or attributes in order to optimally capture video associated with crowdsourced focal point 201. In some embodiments, such parameters or attributes may be determined or refined using AI/ML or other suitable techniques.

Figure 4:
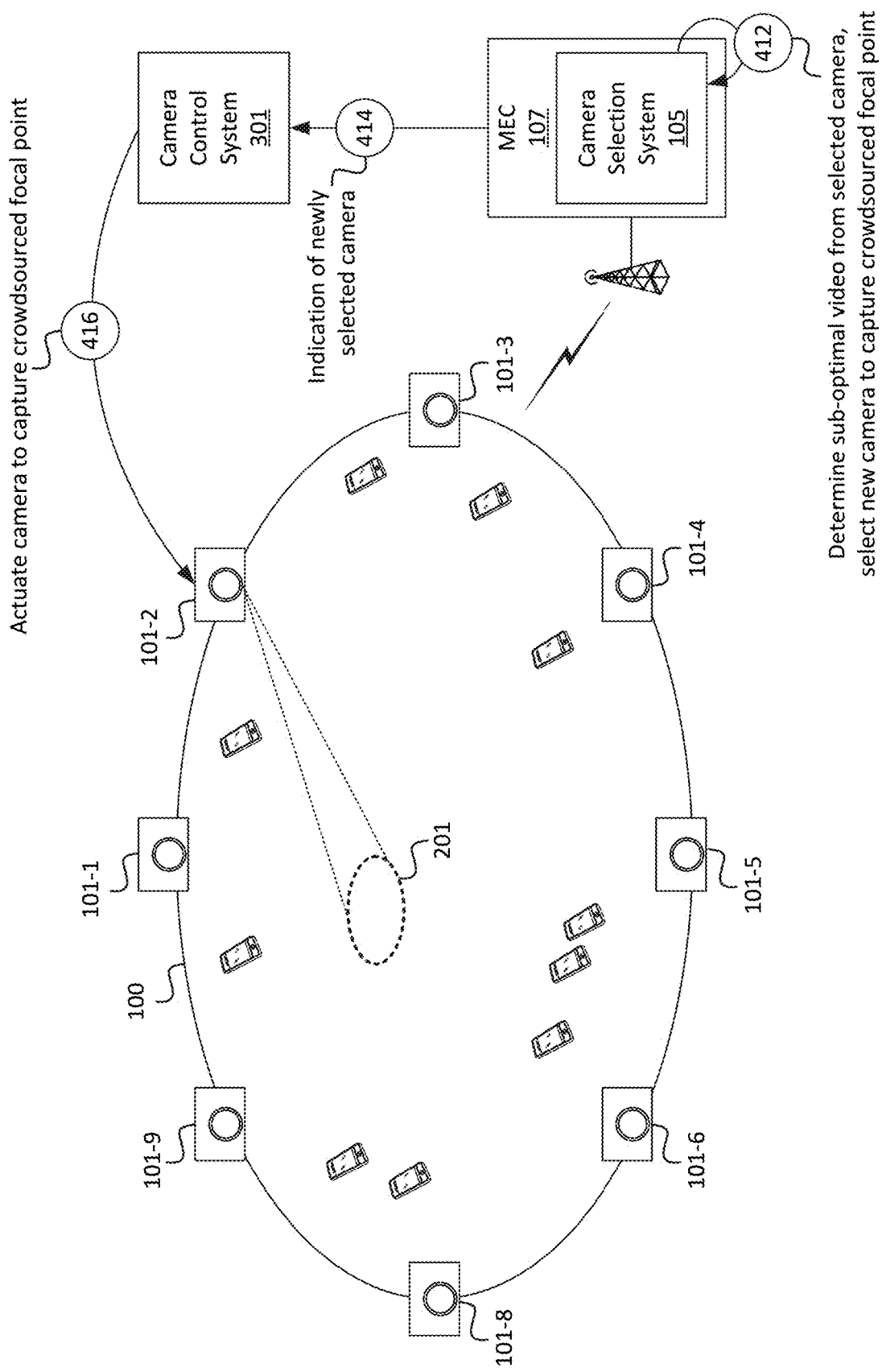
FIG. 4 illustrates an example of the selection and/or actuation of a particular camera, from a set of candidate cameras, to capture video data based on a crowdsourced focal point and further based on a vantage point associated with the particular camera, in accordance with some embodiments.

In some embodiments, Camera Selection System 105 may identify a different fixed camera 101 to capture video associated with crowdsourced focal point 201, in situations where the selected (or higher ranked) fixed camera 101 delivers sub-optimal video content. For example, as shown in FIG. 4, Camera Selection System 105 may determine (at 412) that video from previously selected fixed camera 101-1 is sub-optimal in some way. For example, Camera Selection System 105 may receive video data from fixed camera 101-1 and may determine that one or more obstructions are present, that the actuation (at 310) yields an undesirable viewing angle, that the video data from fixed camera 101-1 depicts an undesirable subject, or the like.

In some embodiments, such analysis may be performed using AI/ML techniques or other suitable techniques. For example, Camera Selection System 105 may determine, based on a "training" phase of AI/ML techniques, that video data depicting a sports field optimally or ideally depicts the sports field with a given range of viewing angles (e.g., overhead angles, oblique angles, end-to-end angles, etc.). In some embodiments, the training phase may include providing or analyzing video content from past events at venue 100 or other venues. For example, such content may include "highlight" clips from a sporting event. In some embodiments, different sets of models or training data may be used to evaluate different types of events occurring at venue 100 at a given time. For example, one model may be trained based on highlights from one or more football games, another model may be trained based on highlights from one or more baseball games, another model may be trained based on highlights from a concert, etc. Such models may be used in different situations in order to evaluate quality or other attributes of video content captured in real time. In this example, Camera Selection System 105 may determine (at 306) that a given viewing angle (e.g., associated with fixed camera 101-1) is "sub-optimal" in situations where the viewing angle deviates from the viewing angle(s) determined during the training phase, and/or otherwise has attributes that deviate from attributes identified with respect to "optimal" video content.

As another example, Camera Selection System 105 may determine, based on the training phase, that video data depicting players in a sporting event depicts the players' faces and/or chests, and/or depicts a ball or other sporting equipment. Additionally, or alternatively, Camera Selection System 105 may determine, based on the training phase, that "sub-optimal" video data depicts the players' backs or feet, depicts partial players, does not depict players at all, and/or does not depict a ball or other suitable sporting equipment.

In such a scenario, Camera Selection System 105 may select (at 412) another fixed camera 101 to capture video associated with crowdsourced focal point 201, and may indicate (at 414) the selection of newly selected fixed camera 101-2 in this example to Camera Control System 301. Camera Control System 301 may accordingly actuate (at 416) the newly selected fixed camera 101-2 to capture video associated with crowdsourced focal point 201.

Figure 5:
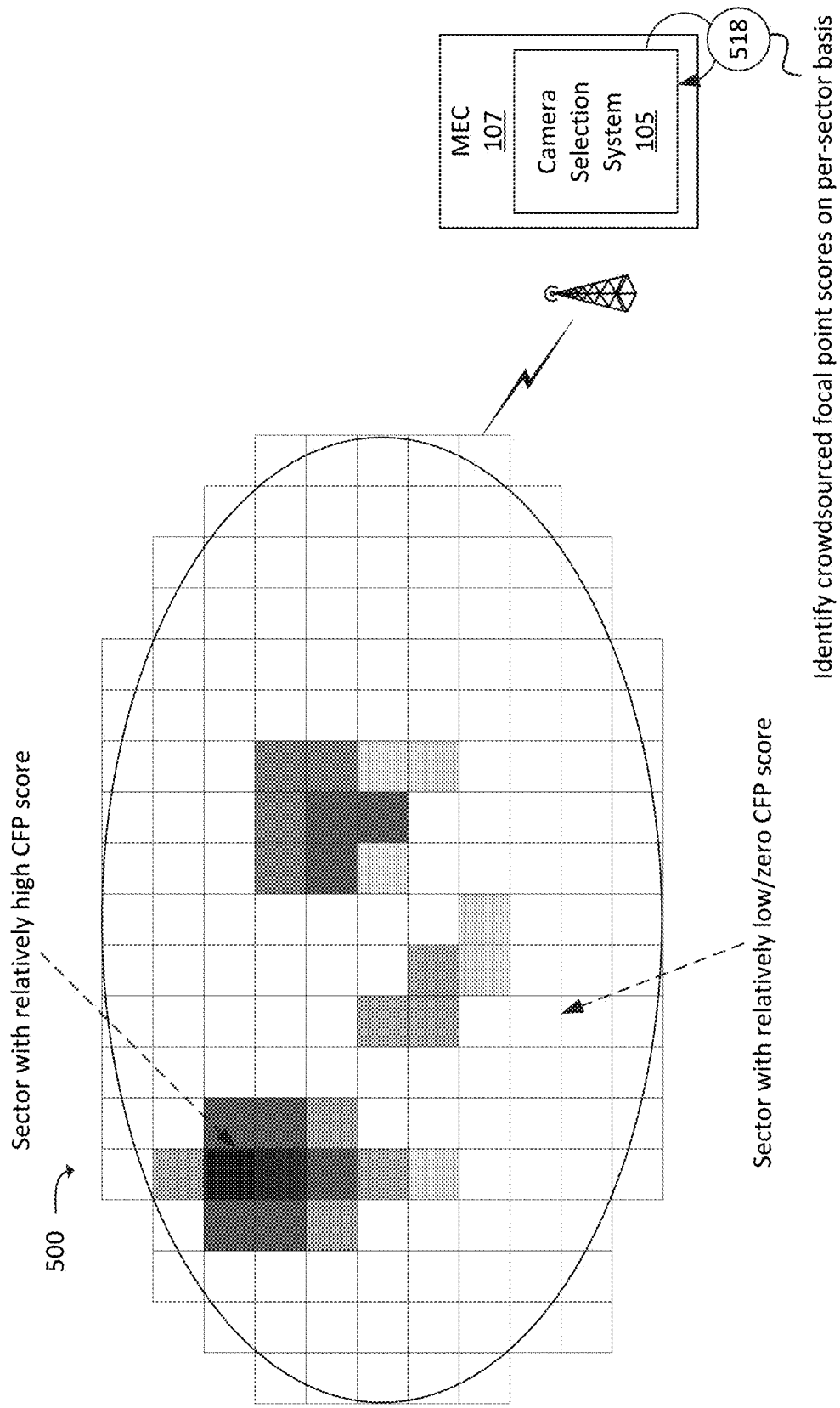
FIG. 5 illustrates an example heatmap which may be used in some embodiments to identify crowdsourced focal points.

As noted above, Camera Selection System 105 may generate a heatmap or other type of representation based on which Camera Selection System 105 may identify one or more crowdsourced focal points, including multiple concurrent crowdsourced focal points. As shown in FIG. 5, for example, Camera Selection System 105 may maintain sector-level information for venue 100, where a "sector" as discussed herein refers to a discrete two-dimensional or three-dimensional area within venue 100. For example, venue 100 may be represented as a grid, which may include square-shaped sectors or cube-shaped sectors (e.g., in two-dimensional representations or three-dimensional representations, respectively). In practice, other two-dimensional or three-dimensional shapes may be used. Further, in practice, sectors may be defined in a non-uniform manner, such that different sectors may be of varying shapes and/or sizes. Additionally, sectors need not be confined to any particular location or area, such as within a given venue 100. That is, while examples herein are described in the context of venue 100, Camera Selection System 105 may perform similar operations as described herein in any type of location or area. For the sake of simplicity, sectors are described herein in the context of a grid consisting of uniformly sized two-dimensional squares.

Camera Selection System 105 may, in some embodiments, identify (at 518) crowdsourced focal point scores ("CFP scores") for each sector. The CFP scores for a given sector may, for example, indicate a quantity of UEs 103 that are facing a given sector. For example, a relatively high CFP score (e.g., 99.0 on a scale of 1.0 to 100.0) for a sector may indicate that a relatively large quantity (e.g., based on a threshold quantity) or proportion (e.g., a proportion of UEs 103 that are present within a threshold distance of the sector) of UEs 103 are facing the sector. On the other hand, a relatively low CFP score (e.g., 1.0) for a sector may indicate that relatively low (or zero) quantity or proportion of UEs 103 are facing the sector. In some embodiments, the CFP score for a sector may be based on a device type of UEs 103 that are pointed at the sector. For example, a sector with a relatively large quantity of wearable devices (e.g., smart glasses) pointed at the sector may have a higher CFP score than a sector with a relatively large quantity of mobile telephones pointed at the sector. In some embodiments, when receiving video data, UE 101 may provide an indication of device type of UE 101 and/or a device type of a device that captured the video data (e.g., internal camera of UE 101, wearable device communicatively coupled to UE 101, etc.). In some embodiments, UE 101 may perform a registration process with Camera Selection System 105, during which the type of capture device (e.g., internal camera, wearable device, etc.) associated with UE 101 may be registered with Camera Selection System 105. In some embodiments, the CFP score may be based on one or more other factors, such as distance of UEs 103 from the sector or other factors.

In some embodiments, the CFP scores for the sectors may be represented by heatmap 500. In some embodiments, Camera Selection System 105 may generate heatmap 500 as a visual representation, which may be provided to Camera Control System 301 or some other device or system. The visual heatmap 500 may be used, for example, by a director or other operator to identify areas (e.g., areas within venue 100) that may be of particular interest to viewers, and such director or other operator may cause one or more fixed cameras 101 or other cameras to capture video at such areas. Additionally, or alternatively, Camera Selection System 105 may generate heatmap 500, and/or one or more data structures which may be conceptualized by heatmap 500, and use such heatmap 500 to identify potential crowdsourced focal points (e.g., sectors or groups of sectors that are crowdsourced focal points as described herein). For example, relatively higher scores may be reflected in heatmap 500 with darker shading, and relatively lower scores may be reflected in heatmap 500 with relatively lighter shading.

Figure 6:
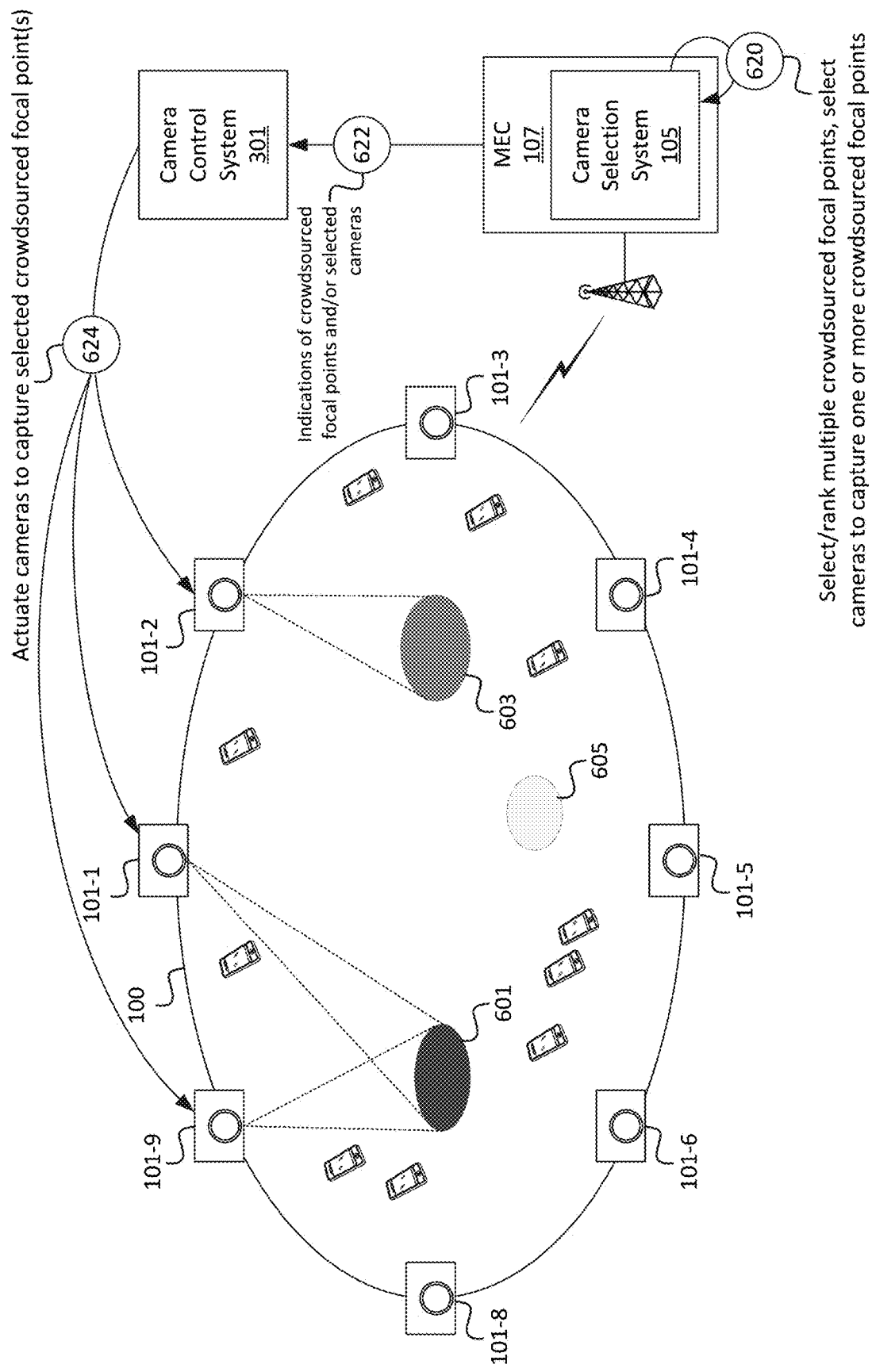
FIG. 6 illustrates the determination and ranking of multiple concurrent crowdsourced focal points and an ensuing selection and/or actuation of one or more cameras, in accordance with some embodiments.

Heatmap 500, or other suitable representation or computation, may thus be used to identify multiple crowdsourced focal points for capture. For example, as shown in FIG. 6, Camera Selection System 105 may select and/or rank (at 620) multiple crowdsourced focal points 601, 603, and 605 based on positioning data from UEs 103, facing data from UEs 103, and/or other suitable information, as described above. In some embodiments, crowdsourced focal points 601, 603, and 605 may be determined based on sector-level CFP scores associated with respective sectors of venue 100. In some embodiments, the selection and/or ranking (at 620) may include generating aggregated CFP scores ("ACFP scores") for particular crowdsourced focal points based on the sector-level CFP scores. For example, such ACFP scores for particular crowdsourced focal points may be based on CFP scores for sectors at a given location and/or within a particular proximity of each other, a quantity of such sectors, and/or one or more other factors. In the example of FIG. 6, crowdsourced focal point 601 may have a relatively high ACFP score, as denoted by its relatively dark shading. Further, crowdsourced focal point 603 may have lower ACFP score than crowdsourced focal point 601, and crowdsourced focal point 605 may have a lower ACFP score than crowdsourced focal point 603.

Further, as shown in FIG. 6, crowdsourced focal point 601, crowdsourced focal point 603, and crowdsourced focal point 605 may be of different shapes and/or sizes. For example, the relatively larger size of crowdsourced focal point 603 may be based on a relatively larger quantity of sectors associated with crowdsourced focal point 603, while the relatively smaller size of crowdsourced focal point 605 may be based on a relatively smaller quantity of sectors associated with crowdsourced focal point 605.

In some embodiments, Camera Selection System 105 may rank crowdsourced focal points 601, 603, and 605 based on ACFP, size, and/or one or more other factors. In the example of FIG. 6, crowdsourced focal point 601 may be a highest ranked crowdsourced focal point, crowdsourced focal point 603 may be the next highest crowdsourced focal point, and crowdsourced focal point 605 may be the lowest ranked crowdsourced focal point. Further, the areas within venue 100 which are not associated with crowdsourced focal points 601, 603, or 605 may be associated with sectors having a relatively low (e.g., below a threshold) or zero CFP score.

In some embodiments, Camera Selection System 105 may select one or more fixed cameras 101 to capture video associated with one or more of the identified crowdsourced focal points, based on the ranking. For example, Camera Selection System 105 may identify that the ACFP score associated with crowdsourced focal point 601 is high enough (e.g., exceeds a threshold) that multiple fixed cameras 101 (e.g., fixed camera 101-1 and fixed camera 101-9 in this example) should be selected to capture video associated with crowdsourced focal point 601. Additionally, or alternatively, Camera Selection System 105 may determine, based on computer vision analysis or other suitable analysis, that fixed camera 101-1 and fixed camera 101-9 have vantage points to capture video at crowdsourced focal point 601 in a manner that viewers may find favorable. For example, fixed camera 101-1 and fixed camera 101-9 may have differing views of players on a field, a ball or other equipment, etc. For instance, based on analyzing video data from fixed camera 101-1 and fixed camera 101-9 using computer vision or some other suitable technique, Camera Selection System 105 may determine that the video data from fixed camera 101-1 and/or fixed camera 101-9 meets criteria associated with one or more AI/ML models associated with capturing video content from multiple angles or vantage points. In some embodiments, Camera Selection System 105 may use differing attributes or parameters for different cameras pointed at the same crowdsourced focal point. For example, Camera Selection System 105 may set a magnified zoom level for fixed camera 101-9 to more closely capture a particular individual (e.g., sports player) or object (e.g., ball or other sporting equipment), while Camera Selection System 105 may use a "standard" zoom level for fixed camera 101-1. As described below, the video captured by multiple cameras may be combined by Camera Selection System 105, Camera Control System 301, and/or some other device or system to generate a combined video stream that is ultimately provided to viewers via broadcast, streaming, and/or other suitable transmission technique.

Camera Selection System 105 may output (at 622) indications of the crowdsourced focal points and/or selected cameras to Camera Control System 301. In some embodiments, Camera Selection System 105 may forgo selecting cameras, and may indicate the locations, ACFP scores, etc. associated with crowdsourced focal points 601, 603, and 605 to Camera Control System 301. Camera Control System 301 may in turn automatically select one or more fixed cameras 101 based on the indicated information, and/or may present such information to a director or other operator.

In some embodiments, although not explicitly shown in FIG. 6, Camera Selection System 105 (and/or Camera Control System 301) may direct all of cameras 101 to face a particular location, which may be crowdsourced focal points 601, 603, or 605, or some other location. For example, Camera Selection System 105 may determine, for each fixed camera 101, one or more visual quality scores (referred to as "VQ scores"), which may be based on a computer vision analysis or other suitable analysis that indicates a quality of video content captured by fixed camera 101 at a particular location. For example, fixed camera 101-1 may be associated with relatively high VQ scores for areas that are relatively close to fixed camera 101-1 and/or for areas that fixed camera 101-1 has an unobstructed line of sight, and may be associated with relatively low VQ scores for areas that are relatively far away from fixed camera 101-1, areas that fixed camera 101-1 has an obstructed line of sight (e.g., a structural column or other type of obstruction), and/or areas that fixed camera 101-1 is unable to face.

In some embodiments, Camera Selection System 105 may not select cameras to capture all of the identified crowdsourced focal points. For example, although crowdsourced focal point 605 has been identified as a crowdsourced focal point, the ACFP score may be relatively lower than the ACFP scores for crowdsourced focal point 601 and/or crowdsourced focal point 603 (e.g., lower by at least a threshold amount), such that crowdsourced focal point 605 is not selected for capture.

Camera Control System 301 may accordingly actuate or otherwise instruct (624) fixed cameras 101-1, 101-2, and 101-9 to capture video associated with crowdsourced focal points. For example, fixed camera 101-1 and fixed camera 101-9 may be actuated to capture video associated with crowdsourced focal point 601, and fixed camera 101-2 may be actuated to capture video associated with crowdsourced focal point 603.

Figure 7:
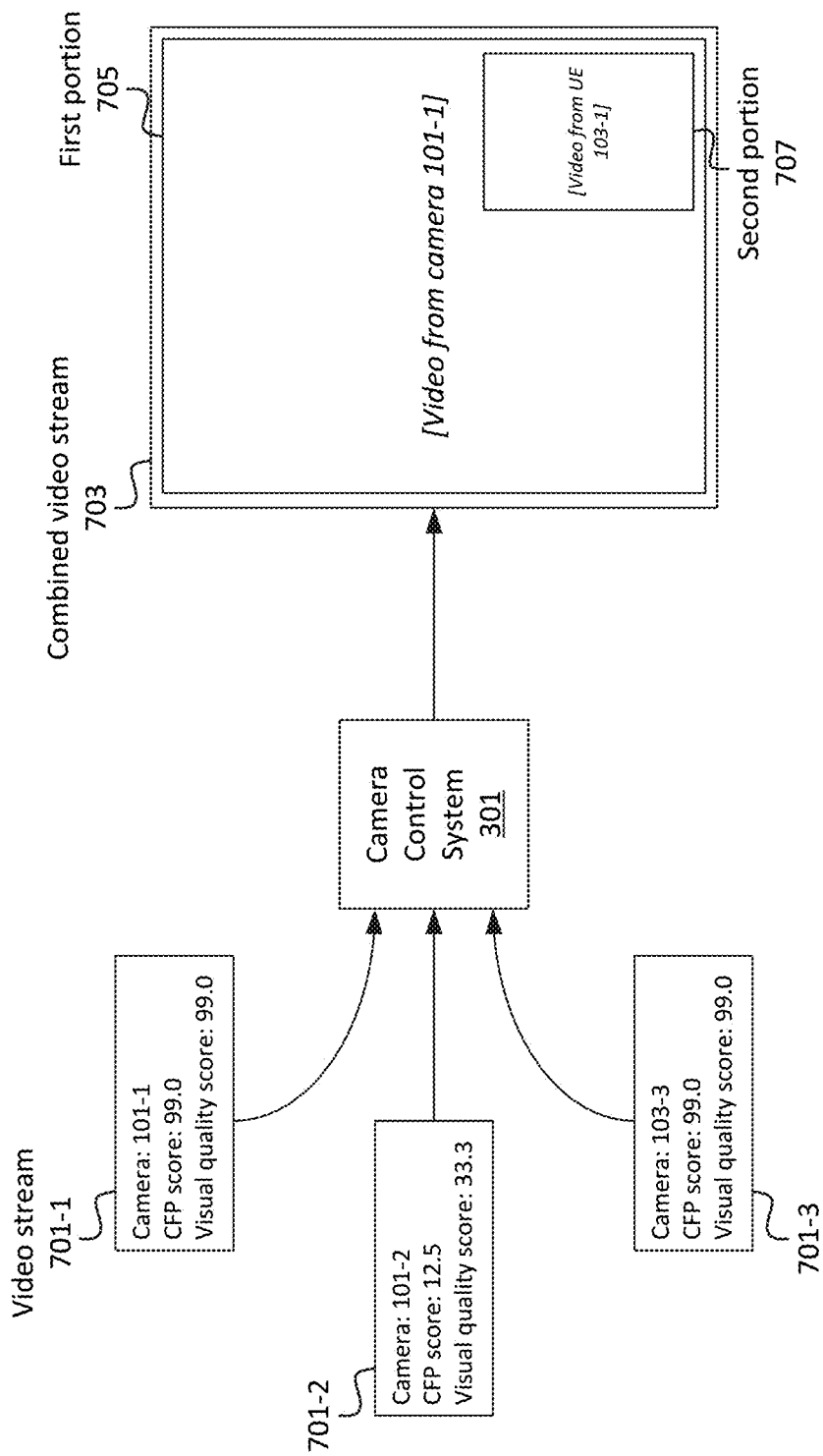
FIGS. 7-9 illustrate example video streams that may be generated and/or provided based on identified crowdsourced focal points, in accordance with some embodiments.
Figure 8:
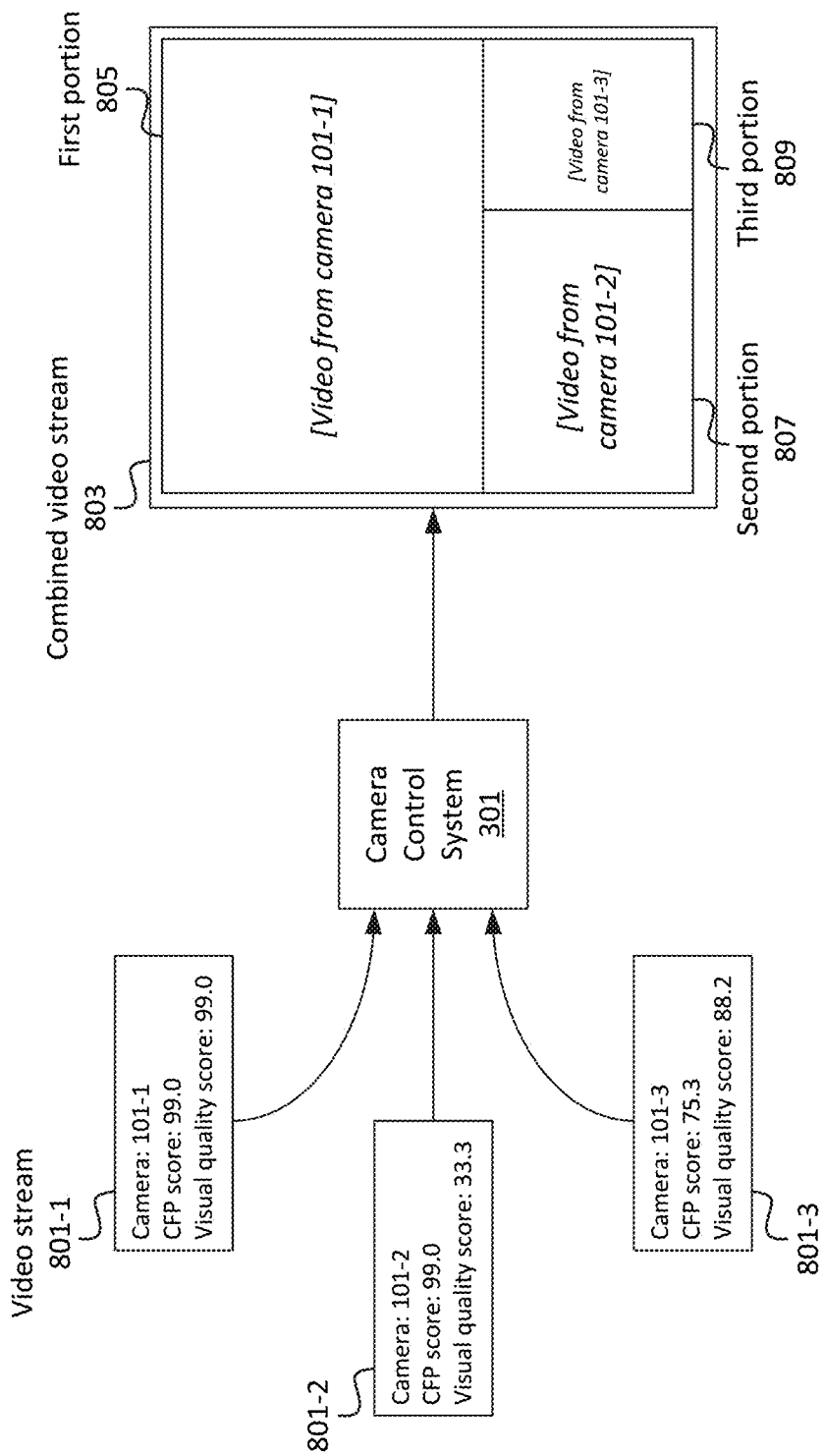
Figure 9:
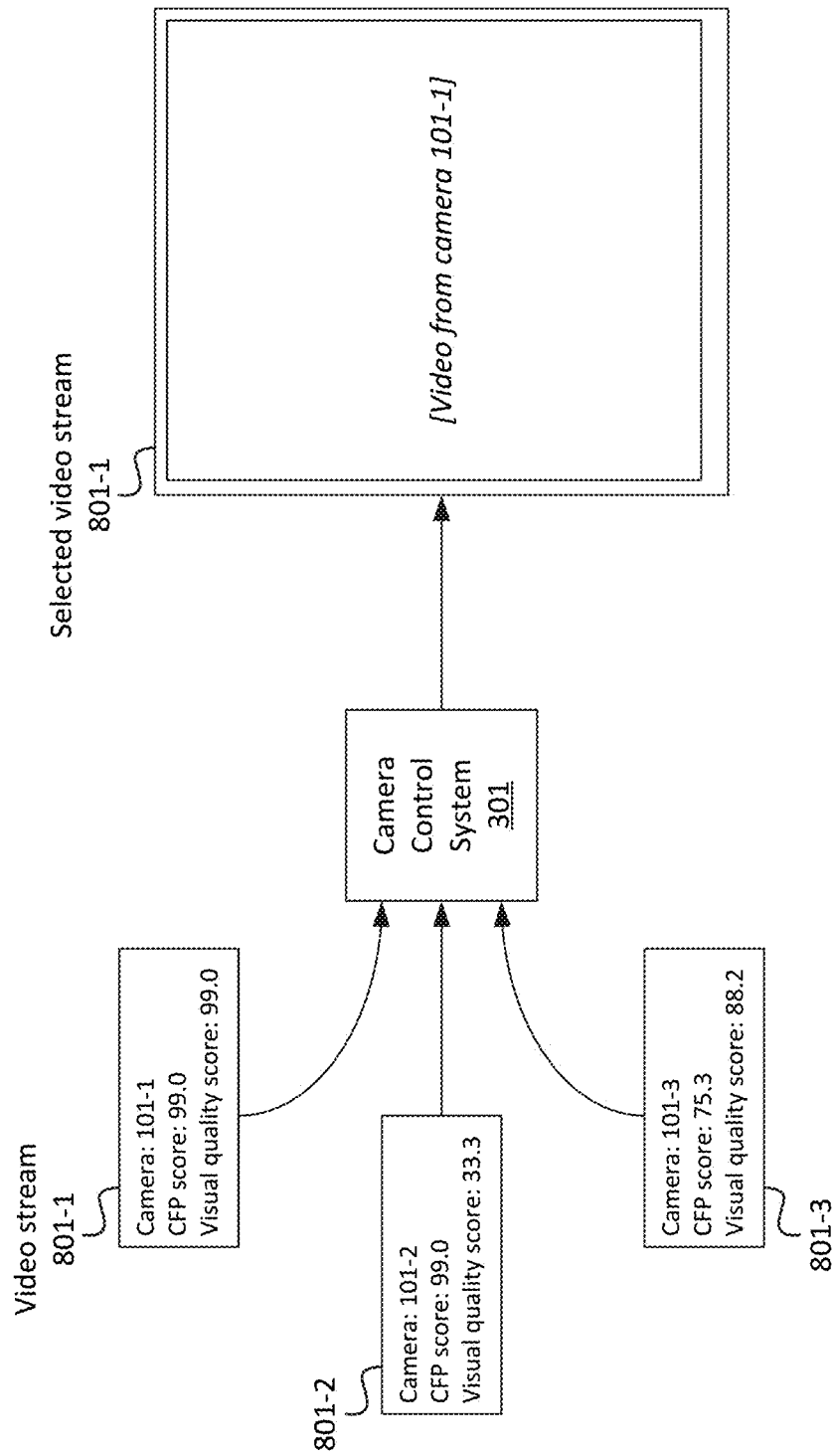

FIGS. 7-9 illustrate example combined video streams, which may be generated based on the capturing of video associated with multiple crowdsourced focal points. In the examples described herein, Camera Control System 301 may generate combined video streams that include video captured by multiple fixed cameras 101 and/or UEs 103. In practice, Camera Selection System 105 and/or some other device or system may generate or determine the parameters for combined video streams.

As shown in FIG. 7, Camera Control System 301 may receive video streams 701-1, 701-2, and 701-3 (sometimes referred to collectively herein as "video streams 701"). In this example, video stream 701-1 may include video content captured by fixed camera 101-1 (e.g., may receive video content from fixed camera 101-1 via an API or other suitable communication pathway), video stream 701-2 may include video content captured by fixed camera 101-2, and video stream 701-3 may include video content captured by UE 103-3. For example, UE 103-3 may implement an API, execute an application, and/or otherwise provide video content (e.g., via a 5G RAN or other wireless interface) to Camera Control System 301, Camera Selection System 105, and/or some other device or system.

Camera Control System 301 may also generate or receive a CFP score associated with each video stream 701. For example, Camera Control System 301 may receive such CFP scores from Camera Selection System 105, and/or may generate CFP scores in a manner similarly described above. In this example, video stream 701-1 may be associated with a CFP score of 99.0, video stream 701-2 may be associated with a CFP score of 12.5, and video stream 701-3 may be associated with a CFP score of 99.0. For example, video streams 701-1 and 701-3 (including video content captured by and/or received from fixed camera 101-1 and UE 103-3, respectively) may have relatively high CFP scores, which may indicate that a relatively large quantity or proportion of UEs 103 are facing a sector or area depicted in video streams 701-1 and 701-3. That is, fixed camera 101-1 and UE 103-3 may be facing one or more sectors which a relatively large quantity or proportion of UEs 103 are facing. In some situations, for example, fixed camera 101-1 may be facing the particular sector or area based on an actuation (e.g., as described above at 310, 416, or 624) or instruction to capture video associated with the particular sector or area.

As further shown, video streams 701 may be associated with VQ scores, which may indicate a measure of quality of the video content depicted by video streams 701. As mentioned above, VQ scores may be determined using one or more suitable models, which may have been trained, generated, refined, etc. based on a same or similar type of event as occurring at a location depicted in video streams 701 and/or a location in which cameras 101 and/or UEs 103 are located (e.g., venue 100). For example, as noted above, if video streams 701 correspond to a football game (e.g., if a time of capture corresponds to a scheduled football game at venue 100, and/or if Camera Selection System 105 uses computer vision or other suitable image analysis techniques to determine that video streams 701 visually depict a football game), Camera Selection System 105 and/or Camera Control System 301 may utilize computer vision or other suitable techniques to compare visual features of the video content to a model that was trained based on highlights from one or more football games. Camera Selection System 105 and/or Camera Control System 301 may accordingly generate the respective VQ scores for video streams 701 based on such computer vision or other suitable analysis.

In this example, video stream 701-1 may be associated with a VQ score of 99.0, video stream 701-2 may be associated with a VQ score of 33.3, and video stream 701-3 may be associated with a VQ score of 99.0. The relatively high VQ scores for video streams 701-1 and 701-3 may indicate that a quality of the content depicted in video streams 701-1 and 701-3 is likely to be perceived by viewers as relatively high, while the relatively low VQ score for video stream 701-2 may indicate that a quality of the content depicted in video stream 701-2 is likely to be perceived by viewers as relatively low.

Based on the CFP scores and/or the VQ scores, Camera Control System 301 may select one or more video streams 701 to present as an output video stream for broadcast or other transmission to users. For example, based on the relatively high CFP and/or VQ scores for video streams 701-1 and 701-3, and/or based on the relatively low CFP and/or VQ scores for video stream 701-2, Camera Control System 301 may select video streams 701-1 and 701-3 to include in combined video stream 703. In some embodiments, Camera Control System 301 may present video streams 701-1 and 701-3 differently, based on the source of the video streams. For example, Camera Control System 301 may more prominently display video content associated with video stream 701-1 in combined video stream 703 based on the source of video stream 701-1 being a fixed camera 101, and may less prominently display video content associated with video stream 701-3 in combined video stream 703 based on the source of video stream 701-3 being a UE 103.

For example, combined video stream 703 may include first portion 705 and second portion 707. First portion 705 may be larger than second portion 707, as second portion 707 may be a less prominent display of video stream 701-3 than video stream 701-1. In this example, second portion 707 may be an overlay over a portion of first portion 705, and may be presented in a manner that indicates that second portion 707 was received from a UE 103. For example, second portion 707 may include a text overlay, such as "Fan camera" or some other suitable message.

FIG. 8 illustrates another example scenario, in which Camera Control System 301 may receive video stream 801-1 from fixed camera 101-1, video stream 801-2 from fixed camera 101-2, and combined video stream 803-1 from fixed camera 101-3. In this example, Camera Control System 301 may generate combined video stream 803, including first portion 805, second portion 807, and third portion 809. Portions 805-809 may, for example, be sized in accordance with their respective CFP scores, VQ scores, one or more other scores or factors, or some combination thereof. In some embodiments, for example, Camera Control System 301, Camera Selection System 105, and/or some other device or system may generate an aggregate score based on the CFP and VQ scores for each video stream 801, and may select whether to include such video streams 801 based on the aggregate scores. In some embodiments, Camera Control System 301, Camera Selection System 105, etc. may determine a size of a respective portion 805-809 of combined video stream 803 for a particular video stream 801 based on the aggregate scores and/or one or more other factors.

FIG. 9 illustrates an example scenario in accordance with some embodiments in which Camera Control System 301 may select a particular video stream to output for broadcast or other transmission to viewers or other users. For example, in this example, Camera Control System 301 may select video stream 801-1 for broadcast or transmission. That is, in some situations, Camera Control System 301 may select a particular video stream to present, rather than generating a combined video stream. FIGS. 7-9 show some examples of combined video streams and/or selections of video streams for broadcast or other presentation or transmission. In practice, other arrangements are possible.

Figure 10:
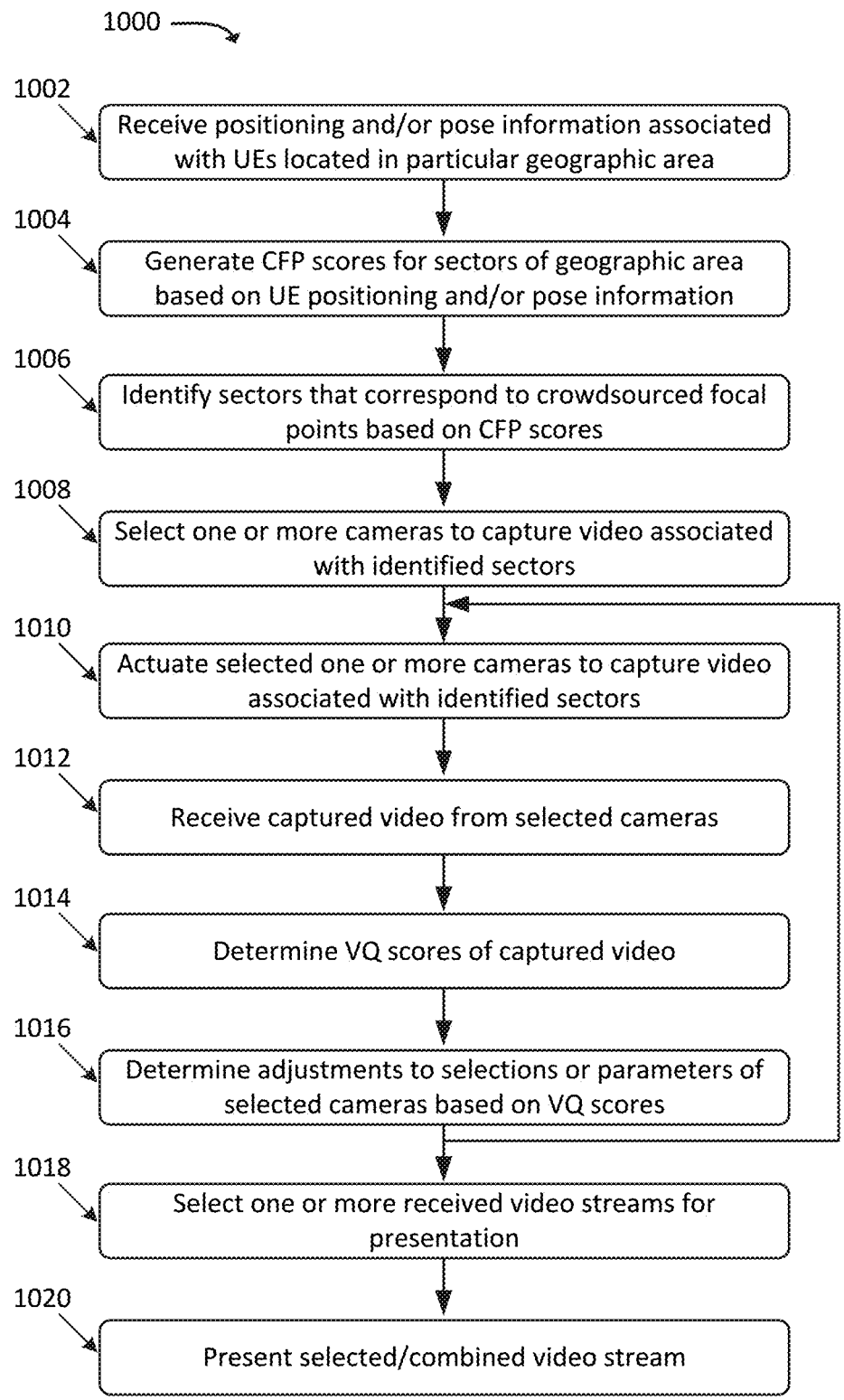
FIG. 10 illustrates an example process for identifying crowdsourced focal points and generating and outputting video content based on the identified crowdsourced focal points, in accordance with some embodiments.

FIG. 10 illustrates an example process 1000 for identifying crowdsourced focal points and generating and outputting video content based on the identified crowdsourced focal points. In some embodiments, some or all of process 1000 may be performed by Camera Selection System 105. In some embodiments, one or more other devices may perform some or all of process 1000 in concert with, and/or in lieu of, Camera Selection System 105. For example, in some embodiments, some or all of process 1000 may be performed by Camera Control System 301.

As shown, process 1000 may include receiving (at 1002) positioning and/or pose information associated with a set of UEs that are located in a particular geographical area. For example, Camera Selection System 105 may receive location information from the UEs via an API or other type of communication pathway. The location information may include UE-determined location information, which may be based on Global Positioning System ("GPS")-based techniques or other suitable techniques. In some embodiments, the location information may include height information, such as altitude, floor of a building, or some other type of height information. In some embodiments, the location information may include network-determined location information, which may be determined by a mobility management component, such as a Mobility Management Entity ("MME"), an Access and Mobility Management Function ("AMF"), or some other suitable network function or device.

In some embodiments, Camera Selection System 105 may evaluate (e.g., according to one or more of the operations describe below) UEs that are located within a particular geofence or other pre-defined geographical area. For example, in some embodiments, Camera Selection System 105 may perform such further operations on UEs for which the received (at 1002) positioning information indicates that such UEs are located within the particular geofence, and may forgo performing such further operations on UEs that are located outside of the particular geofence. In some embodiments, Camera Selection System 105 may perform such operations independent of whether a given UE is located within a given geofence or not.

The pose information for a given UE may indicate an azimuth angle relative to a particular facet or portion of the UE, such as a facet on which a camera of the UE is situated. The pose information may include UE-determined information, which may include pose information derived from sensor data detected by one or more sensors of the UE, such as one or more gyroscopes, accelerometers, or the like.

In some embodiments, Camera Selection System 105 may determine the location and/or pose information for a given UE based on video data received from the UE. For example, Camera Selection System 105 may receive video data captured by one or more cameras of the UE, and may use computer vision, AI/ML, or other suitable techniques to identify location and/or pose information of the UE based on an analysis of the video data.

Process 1000 may further include generating (at 1004) one or more CFP scores for sectors of the geographical area based on positioning and/or pose information for the UEs located in the particular geographical area. In some embodiments, as discussed above, Camera Selection System 105 may determine a quantity of UEs that are facing particular sectors, and may score the sectors according to the quantity of UEs that are facing the sectors. In some embodiments, the CFP scores may reflect particular activities associated with the UEs while the UEs are facing a given sector. For example, a particular UE that is facing a particular sector while a camera application is running on the UE, and/or while the UE is generating or providing video data captured by a camera while the UE is facing the particular sector, may have more of an impact on the CFP score for the sector than a UE that is facing the same sector but is not executing a camera application or capturing video when facing the sector. In some embodiments, the CFP scores may be based on a proportion of UEs in the geographical area that are facing the sector, as opposed to UEs in the geographical area that are not facing the sector. For example, if 80% of the UEs that are present in the geographical area are facing the sector, the CFP score for the sector may be relatively higher than a situation in which 20% of the UEs in the geographical area are facing the sector.

Process 1000 may additionally include identifying (at 1006) sectors that correspond to crowdsourced focal points. For example, Camera Selection System 105 may identify sectors, or clusters of sectors (e.g., where a "cluster" of sector refers to sectors that are contiguous, abutting each other, within a threshold distance of each other, within a threshold distance of a reference point, etc.), that are associated with relatively high CFP scores. For example, a "relatively high" CFP score may refer to a CFP score that exceeds a threshold CFP score. In some embodiments, a "relatively high" CFP score may be a CFP score that is higher than CFP scores for other sectors or clusters of sectors. In some embodiments, the identification (at 1006) of sectors of clusters of sectors may include ranking sectors or clusters of sectors according to CFP scores, and selecting a particular quantity of clusters or sectors that correspond to the highest CFP scores (e.g., the top scoring cluster or sector, the top two scoring clusters or sectors, etc.).

In some embodiments, the CFP scores for sectors in a given cluster may be aggregated into an ACFP score for the cluster, in a manner similarly described above, where the ACFP score for a cluster may be used to rank the cluster and/or to determine whether the cluster corresponds to a crowdsourced focal point. For the sake of brevity, the examples described herein will continue to refer to "sectors" as corresponding to crowdsourced focal points. In practice, similar concepts may apply to groups of sectors (e.g., clusters).

Process 1000 may also include selecting (at 1008) one or more cameras to capture video associated with the identified sectors. For example, the geographical location may be associated with a set of cameras (e.g., as similarly described above with respect to fixed cameras 101). As noted above, the cameras may be automatically or programmatically actuatable, which may include moving, rotating, etc. such cameras or equipment to which such cameras are mounted (e.g., tracks, trolleys, drones, arms, or other suitable actuation or actuatable equipment). The selection may be based on any suitable criteria, such as distance of the cameras from the identified crowdsourced focal points, azimuth angles of the cameras relative to the crowdsourced focal points, and/or other factors.

As discussed above, the selection may be based on VQ scores or other suitable scores, which may indicate or predict a visual quality associated with video captured by a given camera at a given focal point (e.g., one or more of the identified crowdsourced focal points). As also discussed above, Camera Selection System 105 may, in some embodiments, select multiple cameras to capture the same crowdsourced focal point. In some embodiments, Camera Selection System 105 may select a focal point (e.g., a particular one of the identified crowdsourced focal points) for each available candidate camera. In some embodiments, Camera Selection System 105 may select one or more UEs to capture video at one or more crowdsourced focal points. For example, Camera Selection System 105 may determine that the one or more UEs are suitable for such selection based on a vantage point, viewing angle, etc. associated with the one or more UEs.

Process 1000 may further include actuating (at 1010) the selected one or more cameras to capture video associated with the identified sectors. For example, Camera Selection System 105 may output an instruction, command, etc. to the selected cameras and/or to a system that controls the cameras (e.g., Camera Control System 301), to cause the cameras to point at the identified crowdsourced focal points. In some embodiments, the actuation may include moving one or more of the selected cameras, rotating the selected cameras, etc.

Process 1000 may additionally include receiving (at 1012) captured video from the selected cameras. For example, Camera Selection System 105 may receive the captured video via a wired network, a wireless network (e.g., a 5G network or other type of wireless network), or the like.

Process 1000 may also include determining (at 1014) VQ scores of the captured video. For example, Camera Selection System 105 may perform a computer vision analysis or some other type of suitable technique in order to determine a measure of visual quality of the captured video received from one or more the selected cameras.

Process 1000 may further include determining (at 1016) adjustments to the selections of the cameras and/or parameters of the selected cameras based on the VQ scores. For example, as discussed above, Camera Selection System 105 may determine that another camera may provide a better visual quality of the captured video, and/or that different parameters may be applied to a selected camera to improve the visual quality of the captured video. Such parameters may include different positioning or angles, different zoom levels, etc. Once a different camera is selected and/or different parameters for a camera are determined, process 1000 may return to block 1010 to actuate the selected cameras in accordance with the determinations made at block 1016.

Process 1000 may additionally include selecting (at 1018) one or more of the received video streams for presentation. As discussed above, the selection may be based on VQ scores for the received video streams or other suitable criteria. As further described above, one particular video stream (e.g., as received from one camera) may be selected, or multiple video streams may be combined into a combined video stream.

Process 1000 may also include presenting (at 1020) the selected and/or combined video stream. For example, Camera Selection System 105, Camera Control System 301, and/or some other suitable device or system may present the selected and/or combined video stream to a content delivery system, one or more UEs, one or more display devices, or the like. The presentation may include a broadcast, such as a television broadcast, an Internet Protocol ("IP")-based broadcast, a Multimedia Broadcast Multicast Service ("MBMS") broadcast, an evolved MBMS ("eMBMS") broadcast, or the like. In some embodiments, the presentation may include a multicast or unicast transmission, in which a connection or session may be established with one or more presentation devices (e.g., UEs or other types of devices), and the selected and/or combined video stream may be presented via such connection or session.

Figure 11:
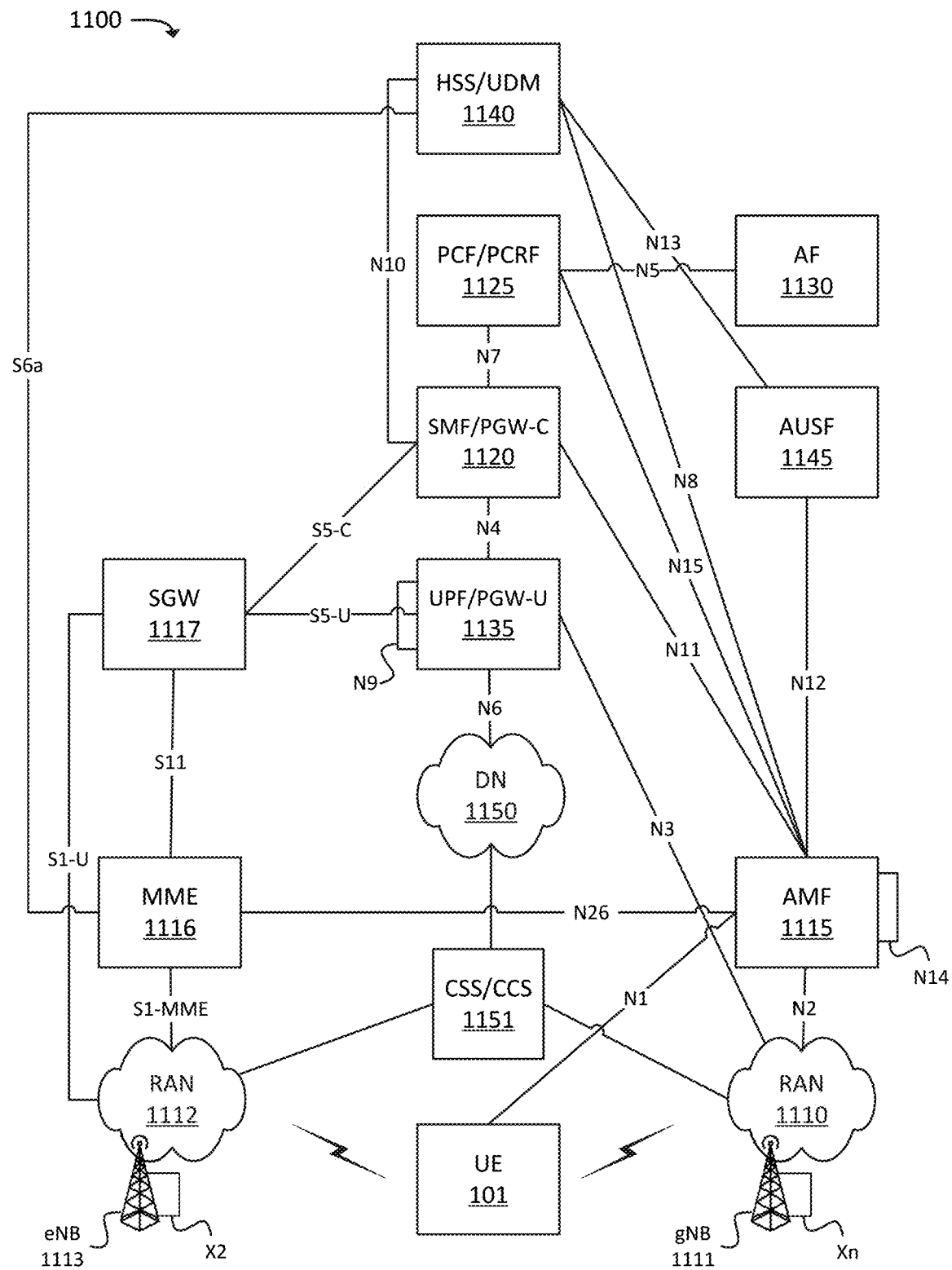
FIG. 11 illustrates an example environment in which one or more embodiments, described herein, may be implemented.

FIG. 11 illustrates an example environment 1100, in which one or more embodiments may be implemented. In some embodiments, environment 1100 may correspond to a 5G network, and/or may include elements of a 5G network. In some embodiments, environment 1100 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). As shown, environment 1100 may include UE 103, RAN 1110 (which may include one or more Next Generation Node Bs ("gNBs") 1111), RAN 1112 (which may include one or more one or more evolved Node Bs ("eNBs") 1113), and various network functions such as AMF 1115, MME 1116, Serving Gateway ("SGW") 1117, Session Management Function ("SMF")/Packet Data Network ("PDN") Gateway ("PGW")-Control plane function ("PGW-C") 1120, Policy Control Function ("PCF")/Policy Charging and Rules Function ("PCRF") 1125, Application Function ("AF") 1130, User Plane Function ("UPF")/PGW-User plane function ("PGW-U") 1135, Home Subscriber Server ("HSS")/Unified Data Management ("UDM") 1140, and Authentication Server Function ("AUSF") 1145. Environment 1100 may also include one or more networks, such as Data Network ("DN") 1150. Environment 1100 may include one or more additional devices or systems communicatively coupled to one or more networks (e.g., DN 1150), such as Camera Selection System/Camera Control System ("CSS/CCS") 1151.

The example shown in FIG. 11 illustrates one instance of each network component or function (e.g., one instance of SMF/PGW-C 1120, PCF/PCRF 1125, UPF/PGW-U 1135, HSS/UDM 1140, and/or 1145). In practice, environment 1100 may include multiple instances of such components or functions. For example, in some embodiments, environment 1100 may include multiple "slices" of a core network, where each slice includes a discrete set of network functions (e.g., one slice may include a first instance of SMF/PGW-C 1120, PCF/PCRF 1125, UPF/PGW-U 1135, HSS/UDM 1140, and/or 1145, while another slice may include a second instance of SMF/PGW-C 1120, PCF/PCRF 1125, UPF/PGW-U 1135, HSS/UDM 1140, and/or 1145). The different slices may provide differentiated levels of service, such as service in accordance with different Quality of Service ("QoS") parameters.

The quantity of devices and/or networks, illustrated in FIG. 11, is provided for explanatory purposes only. In practice, environment 1100 may include additional devices and/or networks, fewer devices and/or networks, different devices and/or networks, or differently arranged devices and/or networks than illustrated in FIG. 11. For example, while not shown, environment 1100 may include devices that facilitate or enable communication between various components shown in environment 1100, such as routers, modems, gateways, switches, hubs, etc. Alternatively, or additionally, one or more of the devices of environment 1100 may perform one or more network functions described as being performed by another one or more of the devices of environment 1100. Devices of environment 1100 may interconnect with each other and/or other devices via wired connections, wireless connections, or a combination of wired and wireless connections. In some implementations, one or more devices of environment 1100 may be physically integrated in, and/or may be physically attached to, one or more other devices of environment 1100.

UE 103 may include a computation and communication device, such as a wireless mobile communication device that is capable of communicating with RAN 1110, RAN 1112, and/or DN 1150. UE 103 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device (e.g., "smart" glasses, "smart" jewelry, or the like), an Internet of Things ("IoT") device, a Mobile-to-Mobile ("M2M") device, or another type of mobile computation and communication device. UE 103 may send traffic to and/or receive traffic (e.g., user plane traffic) from DN 1150 via RAN 1110, RAN 1112, and/or UPF/PGW-U 1135.

RAN 1110 may be, or may include, a 5G RAN that includes one or more base stations (e.g., one or more gNBs 1111), via which UE 103 may communicate with one or more other elements of environment 1100. UE 103 may communicate with RAN 1110 via an air interface (e.g., as provided by gNB 1111). For instance, RAN 1110 may receive traffic (e.g., voice call traffic, data traffic, messaging traffic, signaling traffic, etc.) from UE 103 via the air interface, and may communicate the traffic to UPF/PGW-U 1135, and/or one or more other devices or networks. Similarly, RAN 1110 may receive traffic intended for UE 103 (e.g., from UPF/PGW-U 1135, AMF 1115, and/or one or more other devices or networks) and may communicate the traffic to UE 103 via the air interface. In some embodiments, base station 109 may be, may include, and/or may be implemented by one or more gNBs 1111.

RAN 1112 may be, or may include, a LTE RAN that includes one or more base stations (e.g., one or more eNBs 1113), via which UE 103 may communicate with one or more other elements of environment 1100. UE 103 may communicate with RAN 1112 via an air interface (e.g., as provided by eNB 1113). For instance, RAN 1110 may receive traffic (e.g., voice call traffic, data traffic, messaging traffic, signaling traffic, etc.) from UE 103 via the air interface, and may communicate the traffic to UPF/PGW-U 1135, and/or one or more other devices or networks. Similarly, RAN 1110 may receive traffic intended for UE 103 (e.g., from UPF/PGW-U 1135, SGW 1117, and/or one or more other devices or networks) and may communicate the traffic to UE 103 via the air interface. In some embodiments, base station 109 may be, may include, and/or may be implemented by one or more eNBs 1113.

AMF 1115 may include one or more devices, systems, Virtualized Network Functions ("VNFs"), etc., that perform operations to register UE 103 with the 5G network, to establish bearer channels associated with a session with UE 103, to hand off UE 103 from the 5G network to another network, to hand off UE 103 from the other network to the 5G network, manage mobility of UE 103 between RANs 1110 and/or gNBs 1111, and/or to perform other operations. In some embodiments, the 5G network may include multiple AMFs 1115, which communicate with each other via the N14 interface (denoted in FIG. 11 by the line marked "N14" originating and terminating at AMF 1115).

MME 1116 may include one or more devices, systems, VNFs, etc., that perform operations to register UE 103 with the EPC, to establish bearer channels associated with a session with UE 103, to hand off UE 103 from the EPC to another network, to hand off UE 103 from another network to the EPC, manage mobility of UE 103 between RANs 1112 and/or eNBs 1113, and/or to perform other operations.

SGW 1117 may include one or more devices, systems, VNFs, etc., that aggregate traffic received from one or more eNBs 1113 and send the aggregated traffic to an external network or device via UPF/PGW-U 1135. Additionally, SGW 1117 may aggregate traffic received from one or more UPF/PGW-Us 1135 and may send the aggregated traffic to one or more eNBs 1113. SGW 1117 may operate as an anchor for the user plane during inter-eNB handovers and as an anchor for mobility between different telecommunication networks or RANs (e.g., RANs 1110 and 1112).

SMF/PGW-C 1120 may include one or more devices, systems, VNFs, etc., that gather, process, store, and/or provide information in a manner described herein. SMF/PGW-C 1120 may, for example, facilitate in the establishment of communication sessions on behalf of UE 103. In some embodiments, the establishment of communications sessions may be performed in accordance with one or more policies provided by PCF/PCRF 1125.

PCF/PCRF 1125 may include one or more devices, systems, VNFs, etc., that aggregate information to and from the 5G network and/or other sources. PCF/PCRF 1125 may receive information regarding policies and/or subscriptions from one or more sources, such as subscriber databases and/or from one or more users (such as, for example, an administrator associated with PCF/PCRF 1125).

AF 1130 may include one or more devices, systems, VNFs, etc., that receive, store, and/or provide information that may be used in determining parameters (e.g., quality of service parameters, charging parameters, or the like) for certain applications.

UPF/PGW-U 1135 may include one or more devices, systems, VNFs, etc., that receive, store, and/or provide data (e.g., user plane data). For example, UPF/PGW-U 1135 may receive user plane data (e.g., voice call traffic, data traffic, etc.), destined for UE 103, from DN 1150, and may forward the user plane data toward UE 103 (e.g., via RAN 1110, SMF/PGW-C 1120, and/or one or more other devices). In some embodiments, multiple UPFs 1135 may be deployed (e.g., in different geographical locations), and the delivery of content to UE 103 may be coordinated via the N9 interface (e.g., as denoted in FIG. 11 by the line marked "N9" originating and terminating at UPF/PGW-U 1135). Similarly, UPF/PGW-U 1135 may receive traffic from UE 103 (e.g., via RAN 1110, SMF/PGW-C 1120, and/or one or more other devices), and may forward the traffic toward DN 1150. In some embodiments, UPF/PGW-U 1135 may communicate (e.g., via the N4 interface) with SMF/PGW-C 1120, regarding user plane data processed by UPF/PGW-U 1135.

HSS/UDM 1140 and AUSF 1145 may include one or more devices, systems, VNFs, etc., that manage, update, and/or store, in one or more memory devices associated with AUSF 1145 and/or HSS/UDM 1140, profile information associated with a subscriber. AUSF 1145 and/or HSS/UDM 1140 may perform authentication, authorization, and/or accounting operations associated with the subscriber and/or a communication session with UE 103.

DN 1150 may include one or more wired and/or wireless networks. For example, DN 1150 may include an Internet Protocol ("IP")-based PDN, a wide area network ("WAN") such as the Internet, a private enterprise network, and/or one or more other networks. UE 103 may communicate, through DN 1150, with data servers, other UEs 103, and/or to other servers or applications that are coupled to DN 1150. DN 1150 may be connected to one or more other networks, such as a public switched telephone network ("PSTN"), a public land mobile network ("PLMN"), and/or another network. DN 1150 may be connected to one or more devices, such as content providers, applications, web servers, and/or other devices, with which UE 103 may communicate.

Figure 12:
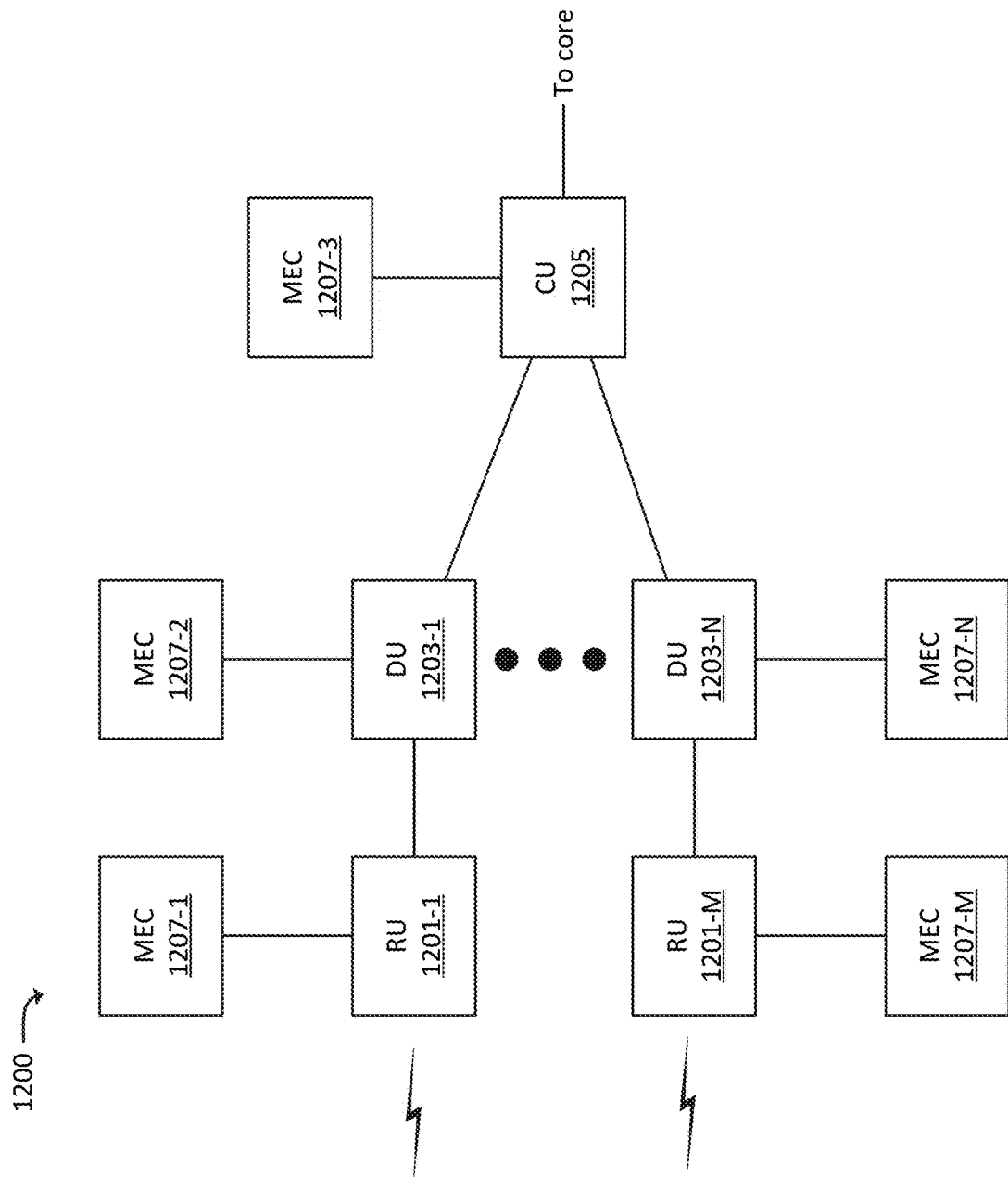
FIG. 12 illustrates an example arrangement of a radio access network ("RAN"), in accordance with some embodiments.

CSS/CCS 1151 may include one or more devices, systems, VNFs, etc. that perform one or more operations described herein. For example, CSS/CCS 1151 may, for example, perform operations described herein with respect to Camera Selection System 105, Camera Control System 301, and/or one or more other operations. In some embodiments, Camera Selection System 105 may be implemented by one device or system, while Camera Control System 301 may be implemented by another device or system. In such situations, Camera Control System 301 and Camera Selection System 105 may be communicatively coupled via one or more APIs or other suitable communication pathways. In some embodiments, CSS/CCS 1151 may be communicatively coupled to one or more UEs 103, cameras (e.g., fixed cameras 101), and/or other devices or systems via RAN 1110, RAN 1112, DN 1150, and/or some other network or communication interface, FIG. 12 illustrates an example Distributed Unit ("DU") network 1200, which may be included in and/or implemented by one or more RANs (e.g., RAN 1110, RAN 1112, or some other RAN). In some embodiments, a particular RAN may include one DU network 1200. In some embodiments, a particular RAN may include multiple DU networks 1200. In some embodiments, DU network 1200 may correspond to a particular gNB 1111 of a 5G RAN (e.g., RAN 1110). In some embodiments, DU network 1200 may correspond to multiple gNBs 1111. In some embodiments, DU network 1200 may correspond to one or more other types of base stations of one or more other types of RANs. As shown, DU network 1200 may include Central Unit ("CU") 1205, one or more Distributed Units ("DUs") 1203-1 through 1203-N (referred to individually as "DU 1203," or collectively as "DUs 1203"), and one or more Radio Units ("RUs") 1201-1 through 1201-M (referred to individually as "RU 1201," or collectively as "RUs 1201").

CU 1205 may communicate with a core of a wireless network (e.g., may communicate with one or more of the devices or systems described above with respect to FIG. 11, such as AMF 1115 and/or UPF/PGW-U 1135). In the uplink direction (e.g., for traffic from UEs 103 to a core network), CU 1205 may aggregate traffic from DUs 1203, and forward the aggregated traffic to the core network. In some embodiments, CU 1205 may receive traffic according to a given protocol (e.g., Radio Link Control ("RLC")) from DUs 1203, and may perform higher-layer processing (e.g., may aggregate/process RLC packets and generate Packet Data Convergence Protocol ("PDCP") packets based on the RLC packets) on the traffic received from DUs 1203.

In accordance with some embodiments, CU 1205 may receive downlink traffic (e.g., traffic from the core network) for a particular UE 103, and may determine which DU(s) 1203 should receive the downlink traffic. DU 1203 may include one or more devices that transmit traffic between a core network (e.g., via CU 1205) and UE 103 (e.g., via a respective RU 1201). DU 1203 may, for example, receive traffic from RU 1201 at a first layer (e.g., physical ("PHY") layer traffic, or lower PHY layer traffic), and may process/aggregate the traffic to a second layer (e.g., upper PHY and/or RLC). DU 1203 may receive traffic from CU 1205 at the second layer, may process the traffic to the first layer, and provide the processed traffic to a respective RU 1201 for transmission to UE 103.

RU 1201 may include hardware circuitry (e.g., one or more RF transceivers, antennas, radios, and/or other suitable hardware) to communicate wirelessly (e.g., via an RF interface) with one or more UEs 103, one or more other DUs 1203 (e.g., via RUs 1201 associated with DUs 1203), and/or any other suitable type of device. In the uplink direction, RU 1201 may receive traffic from UE 103 and/or another DU 1203 via the RF interface and may provide the traffic to DU 1203. In the downlink direction, RU 1201 may receive traffic from DU 1203, and may provide the traffic to UE 103 and/or another DU 1203.

RUs 1201 may, in some embodiments, be communicatively coupled to one or more Multi-Access/Mobile Edge Computing ("MEC") devices, referred to sometimes herein simply as ("MECs") 1207. For example, RU 1201-1 may be communicatively coupled to MEC 1207-1, RU 1201-M may be communicatively coupled to MEC 1207-M, DU 1203-1 may be communicatively coupled to MEC 1207-2, DU 1203-N may be communicatively coupled to MEC 1207-N, CU 1205 may be communicatively coupled to MEC 1207-3, and so on. MECs 1207 may include hardware resources (e.g., configurable or provisionable hardware resources) that may be configured to provide services and/or otherwise process traffic to and/or from UE 103, via a respective RU 1201.

For example, RU 1201-1 may route some traffic, from UE 103, to MEC 1207-1 instead of to a core network (e.g., via DU 1203 and CU 1205). MEC 1207-1 may process the traffic, perform one or more computations based on the received traffic, and may provide traffic to UE 103 via RU 1201-1. In this manner, ultra-low latency services may be provided to UE 103, as traffic does not need to traverse DU 1203, CU 1205, and an intervening backhaul network between DU network 1200 and the core network. In some embodiments, MEC 1207 may include, and/or may implement some or all of the functionality described above with respect to Camera Selection System 105, Camera Control System 301, CSS/CCS 1151, and/or one or more other devices or systems.

Figure 13:
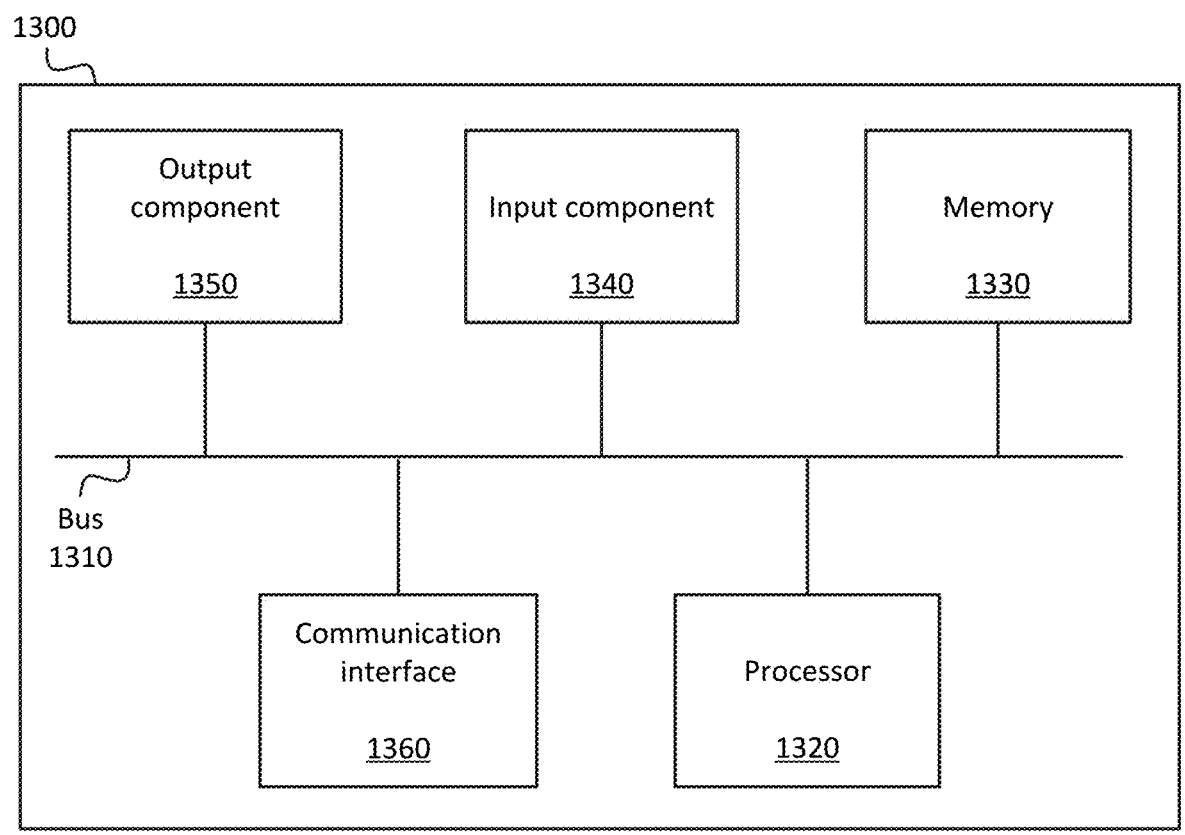
FIG. 13 illustrates example components of one or more devices, in accordance with one or more embodiments described herein.

FIG. 13 illustrates example components of device 1300. One or more of the devices described above may include one or more devices 1300. Device 1300 may include bus 1310, processor 1320, memory 1330, input component 1340, output component 1350, and communication interface 1360. In another implementation, device 1300 may include additional, fewer, different, or differently arranged components.

Bus 1310 may include one or more communication paths that permit communication among the components of device 1300. Processor 1320 may include a processor, microprocessor, or processing logic that may interpret and execute instructions. Memory 1330 may include any type of dynamic storage device that may store information and instructions for execution by processor 1320, and/or any type of non-volatile storage device that may store information for use by processor 1320.

Input component 1340 may include a mechanism that permits an operator to input information to device 1300 and/or other receives or detects input from a source external to 1340, such as a touchpad, a touchscreen, a keyboard, a keypad, a button, a switch, a microphone or other audio input component, etc. In some embodiments, input component 1340 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 1350 may include a mechanism that outputs information to the operator, such as a display, a speaker, one or more light emitting diodes ("LEDs"), etc.

Communication interface 1360 may include any transceiver-like mechanism that enables device 1300 to communicate with other devices and/or systems. For example, communication interface 1360 may include an Ethernet interface, an optical interface, a coaxial interface, or the like. Communication interface 1360 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1300 may include more than one communication interface 1360. For instance, device 1300 may include an optical interface and an Ethernet interface.

Device 1300 may perform certain operations relating to one or more processes described above. Device 1300 may perform these operations in response to processor 1320 executing software instructions stored in a computer-readable medium, such as memory 1330. A computer-readable medium may be defined as a non-transitory memory device. A memory device may include space within a single physical memory device or spread across multiple physical memory devices. The software instructions may be read into memory 1330 from another computer-readable medium or from another device. The software instructions stored in memory 1330 may cause processor 1320 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-9), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
one or more processors configured to:
  determine positioning and pose information associated with a plurality of User Equipment ("UEs") located within a particular geographical area;
  identify, based on the positioning and pose information associated with the plurality of UEs, a focal point within the particular geographical area, wherein identifying the focal point includes determining, based on the positioning and pose information associated with the plurality of UEs, that at least a threshold quantity of UEs are pointed at the focal point;
  receive a plurality of video streams that are each associated with a respective camera, of a plurality of cameras;
  select one or more cameras, of the plurality of cameras, based on the focal point that was identified based on the positioning and pose information associated with the plurality of UEs; and
  output one or more video streams associated with the selected one or more cameras.

2. The device of claim 1, wherein the one or more processors are further configured to:
rank each respective camera, of the plurality of cameras, prior to selecting the one or more cameras, wherein the selecting is based on the ranking.

3. The device of claim 1, wherein the one or more processors are further configured to:
actuate at least a particular camera of the selected one or more cameras based on the identified focal point, wherein actuating the particular camera includes at least one of:
  physically displacing the particular camera from a first position to a second position, or
  modifying a viewing angle of the particular camera from a first viewing angle to a second viewing angle,
  wherein the physically displacing, the modifying the viewing angle, or a combination thereof causes the particular camera to capture video content associated with the identified focal point.

4. The device of claim 3, wherein the physically displacing includes causing an apparatus, to which the one or more cameras are attached, to move towards the second position.

5. The device of claim 4, wherein the apparatus includes a drone to which the one or more cameras are attached.

6. A device, comprising:
one or more processors configured to:
determine positioning and pose information associated with a plurality of User Equipment ("UEs") located within a particular geographical area, wherein the geographical area includes a plurality of sectors;
generate, for each sector of the plurality of sectors, a score that is based on a quantity of UEs that are pointed at the each sector;
determine that the respective scores for one or more sectors, of the plurality of sectors, exceed one or more threshold scores;
identify, based on the positioning and pose information associated with the plurality of UEs, and further based on determining that the respective scores for the one or more sectors exceed the one or more threshold scores, a focal point within the particular geographical area, wherein the focal point is identified based on the one or more sectors;
receive a plurality of video streams that are each associated with a respective camera, of a plurality of cameras;
select one or more cameras, of the plurality of cameras, based on the focal point that was identified based on the positioning and pose information associated with the plurality of UEs and further based on the respective scores for the one or more sectors; and
output one or more video streams associated with the selected one or more cameras.

7. The device of claim 6, wherein the pose information associated with a particular UE, of the plurality of UEs, includes an azimuth angle relative to a facet of the particular UE on which a camera of the particular UE is situated.

8. The device of claim 6, wherein the physically displacing includes causing an apparatus, to which the one or more cameras are attached, to move towards the second position.

9. The method of claim 8, wherein the apparatus includes a drone to which the one or more cameras are attached.

10. A non-transitory computer-readable medium, storing a plurality of processor-executable instructions to:
determine positioning and pose information associated with a plurality of User Equipment ("UEs") located within a particular geographical area;
identify, based on the positioning and pose information associated with the plurality of UEs, a focal point within the particular geographical area, wherein identifying the focal point includes determining, based on the positioning and pose information associated with the plurality of UEs, that at least a threshold quantity of UEs are pointed at the focal point;
receive a plurality of video streams that are each associated with a respective camera, of a plurality of cameras;
select one or more cameras, of the plurality of cameras, based on the focal point that was identified based on the positioning and pose information associated with the plurality of UEs; and
output one or more video streams associated with the selected one or more cameras.

11. The non-transitory computer-readable medium of claim 10, wherein the plurality of processor-executable instructions further include processor-executable instructions to:
rank each respective camera, of the plurality of cameras, prior to selecting the one or more cameras, wherein the selecting is based on the ranking.

12. The non-transitory computer-readable medium of claim 10, wherein the plurality of processor-executable instructions further include processor-executable instructions to:
actuate at least a particular camera of the selected one or more cameras based on the identified focal point, wherein actuating the particular camera includes at least one of:
physically displacing the particular camera from a first position to a second position, or
modifying a viewing angle of the particular camera from a first viewing angle to a second viewing angle,
wherein the physically displacing, the modifying the viewing angle, or a combination thereof causes the particular camera to capture video content associated with the identified focal point.

13. The non-transitory computer-readable medium of claim 12, wherein the physically displacing includes causing a drone, to which the one or more cameras are attached, to move towards the second position.

14. A non-transitory computer-readable medium, storing a plurality of processor-executable instructions to:
determine positioning and pose information associated with a plurality of User Equipment ("UEs") located within a particular geographical area, wherein the geographical area includes a plurality of sectors;
generate, for each sector of the plurality of sectors, a score that is based on a quantity of UEs that are pointed at the each sector;
determine that the respective scores for one or more sectors, of the plurality of sectors, exceed one or more threshold scores;
identify, based on the positioning and pose information associated with the plurality of UEs, and further based on determining that the respective scores for the one or more sectors exceed the one or more threshold scores, a focal point within the particular geographical area, wherein the focal point is identified based on the one or more sectors;
receive a plurality of video streams that are each associated with a respective camera, of a plurality of cameras;
select one or more cameras, of the plurality of cameras, based on the focal point that was identified based on the positioning and pose information associated with the plurality of UEs and further based on the respective scores for the one or more sectors; and
output one or more video streams associated with the selected one or more cameras.

15. The non-transitory computer-readable medium of claim 14, wherein the pose information associated with a particular UE, of the plurality of UEs, includes an azimuth angle relative to a facet of the particular UE on which a camera of the particular UE is situated.

16. A method, comprising:
determining positioning and pose information associated with a plurality of User Equipment ("UEs") located within a particular geographical area;
identifying, based on the positioning and pose information associated with the plurality of UEs, a focal point within the particular geographical area, wherein identifying the focal point includes determining, based on the positioning and pose information associated with the plurality of UEs, that at least a threshold quantity of UEs are pointed at the focal point;

receiving a plurality of video streams that are each associated with a respective camera, of a plurality of cameras;

selecting one or more cameras, of the plurality of cameras, based on the focal point that was identified based on the positioning and pose information associated with the plurality of UEs; and outputting one or more video streams associated with the selected one or more cameras.

17. The method of claim 16, further comprising:

ranking each respective camera, of the plurality of cameras, prior to selecting the one or more cameras, wherein the selecting is based on the ranking.

18. The method of claim 16, further comprising:

actuating at least a particular camera of the selected one or more cameras based on the identified focal point, wherein actuating the particular camera includes at least one of:

physically displacing the particular camera from a first position to a second position, or modifying a viewing angle of the particular camera from a first viewing angle to a second viewing angle, wherein the physically displacing, the modifying the viewing angle, or a combination thereof causes the particular camera to capture video content associated with the identified focal point.

19. A method, comprising:

determining positioning and pose information associated with a plurality of User Equipment ("UEs") located within a particular geographical area, wherein the geographical area includes a plurality of sectors;

generating, for each sector of the plurality of sectors, a score that is based on a quantity of UEs that are pointed at the each sector;

determining that the respective scores for one or more sectors, of the plurality of sectors, exceed one or more threshold scores;

identifying, based on the positioning and pose information associated with the plurality of UEs, and further based on determining that the respective scores for the one or more sectors exceed the one or more threshold scores, a focal point within the particular geographical area, wherein the focal point is identified based on the one or more sectors;

receiving a plurality of video streams that are each associated with a respective camera, of a plurality of cameras;

selecting one or more cameras, of the plurality of cameras, based on the focal point that was identified based on the positioning and pose information associated with the plurality of UEs and further based on the respective scores for the one or more sectors; and outputting one or more video streams associated with the selected one or more cameras.

20. The method of claim 19, wherein the pose information associated with a particular UE, of the plurality of UEs, includes an azimuth angle relative to a facet of the particular UE on which a camera of the particular UE is situated.

* * * * *